US012596076B2

(12) United States Patent
Kommareddy et al.

(10) Patent No.: US 12,596,076 B2
(45) Date of Patent: Apr. 7, 2026

(54) INSPECTION SYSTEMS AND METHODS EMPLOYING DIFFERENT WAVELENGTH DIRECTIONAL LIGHT FOR ENHANCED IMAGING

(71) Applicants:General Electric Company, Schenectady, NY (US); OLIVER CRISPIN ROBOTICS LIMITED, Altrincham (GB)

(72) Inventors: Vamshi Krishna Reddy Kommareddy, Bangalore (IN); Biswajit Medhi, Bangalore (IN); Andrew Crispin Graham, Badminton (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 271 days.

(21) Appl. No.: 17/985,501

(22) Filed: Nov. 11, 2022

(65) Prior Publication Data

US 2024/0159711 A1     May 16, 2024

(51) Int. Cl.
G01N 21/88 (2006.01)
G01N 21/954 (2006.01)
(Continued)

(52) U.S. Cl.
CPC ..... G01N 21/8851 (2013.01); G01N 21/8806 (2013.01); G01N 21/954 (2013.01);
(Continued)

(58) Field of Classification Search
CPC ........... G01N 21/8851; G01N 21/8806; G01N 21/954; G01N 29/043; G01N 21/9515;
(Continued)

(56) References Cited

U.S. PATENT DOCUMENTS 3,778,170 A * 12/1973 Howell .............. G02B 23/2476
600/114
4,847,510 A * 7/1989 Douglas ............... G01B 11/303
356/600
(Continued)

FOREIGN PATENT DOCUMENTS

CA       2362712       8/2000
CN       102473308     5/2012
(Continued)

OTHER PUBLICATIONS

U.S. Appl. No. 17/373,920; Non-Final Rejection mailed Feb. 11, 2025; (pp. 1-26).

(Continued)

*Primary Examiner* — Michael P LaPage
(74) *Attorney, Agent, or Firm* — Fitch, Even, Tabin & Flannery LLP

(57) ABSTRACT

An inspection system and related methods are provided. The inspection system includes an inspection camera, a plurality of light sources collocated with the inspection camera, and a post processing system. The plurality of light sources output directional light that have different respective ranges of light wavelengths. The inspection camera is configured to capture image data while a surface of interest is being illuminated with the directional light. Further, the post processing system is configured to receive the image data, process portions of the image data into a plurality of images that include distinct images corresponding to the different respective ranges of light wavelengths. The plurality of images can be reviewed to identify an abnormal region of the surface of interest.

14 Claims, 13 Drawing Sheets

(51) Int. Cl.
| | |
|---|---|
| *G01N 29/04* | (2006.01) |
| *G02B 23/24* | (2006.01) |
| *G06T 7/00* | (2017.01) |
| *G01N 21/95* | (2006.01) |
| *G01N 21/956* | (2006.01) |

(52) U.S. Cl.
CPC ....... *G01N 29/043* (2013.01); *G02B 23/2415* (2013.01); *G02B 23/2461* (2013.01); *G02B 23/2476* (2013.01); *G02B 23/2484* (2013.01); *G06T 7/0004* (2013.01); *G01N 2021/8845* (2013.01); *G01N 21/9515* (2013.01); *G01N 21/95684* (2013.01); *G01N 2291/044* (2013.01); *G06T 2207/30164* (2013.01)

(58) Field of Classification Search
CPC ..... G01N 21/95684; G01N 2021/8845; G01N 2291/044; G02B 23/2415; G02B 23/2461; G02B 23/2476; G02B 23/2484; G06T 7/0004; G06T 2207/30164
See application file for complete search history.

(56) References Cited

U.S. PATENT DOCUMENTS

| | | | |
|---|---|---|---|
| 5,610,994 A | 3/1997 | Stadtfeld | |
| 6,665,441 B1 | 12/2003 | Nishio | |
| 6,700,668 B2 | 3/2004 | Mundy | |
| 6,901,160 B2 | 5/2005 | Chapman | |
| 6,987,876 B2 | 1/2006 | Silber | |
| 7,427,262 B2 | 9/2008 | Bonningue | |
| 7,543,518 B2 | 6/2009 | Buckingham | |
| 8,069,747 B2 | 12/2011 | Buckingham | |
| 8,144,411 B2 | 3/2012 | Yazdanfar | |
| 8,194,948 B2 | 6/2012 | Hori | |
| 8,200,042 B2 | 6/2012 | Doi | |
| 8,238,642 B2 | 8/2012 | Wu | |
| 8,248,465 B2 | 8/2012 | Doi | |
| 8,285,362 B2 | 10/2012 | Dietz | |
| 8,480,563 B2 | 7/2013 | Nakano | |
| 8,493,558 B2 | 7/2013 | Asada | |
| 8,558,879 B2 | 10/2013 | Doi | |
| 8,562,516 B2 | 10/2013 | Saadat | |
| 8,602,722 B2 | 12/2013 | George | |
| 8,768,046 B2 | 7/2014 | Ernst | |
| 8,913,110 B2 | 12/2014 | Hori | |
| 8,965,103 B2 | 2/2015 | Hori | |
| 9,036,142 B2 | 5/2015 | Ahner | |
| 9,046,496 B2 | 6/2015 | Tsai | |
| 9,251,582 B2 | 2/2016 | Lim | |
| 9,271,637 B2 | 3/2016 | Farr | |
| 9,275,473 B2 | 3/2016 | Hori | |
| 9,300,926 B2 | 3/2016 | Kell | |
| 9,392,230 B2 | 7/2016 | Yokota | |
| 9,412,189 B2 | 8/2016 | Bendall | |
| 9,939,386 B2 | 4/2018 | Lewis | |
| 9,984,474 B2 | 5/2018 | Bendall | |
| 10,074,169 B2 | 9/2018 | Niedermeier | |
| 10,104,313 B2 | 10/2018 | Slavens | |
| 10,126,117 B1 | 11/2018 | Byers | |
| 10,147,176 B1 | 12/2018 | Sones | |
| 10,255,519 B2 | 4/2019 | Nagatomo | |
| 10,290,113 B2 | 5/2019 | Akagi | |
| 10,504,220 B2 | 12/2019 | Lim | |
| 10,536,617 B2 | 1/2020 | Liang | |
| 10,564,111 B2 | 2/2020 | Safai | |
| 10,636,148 B1 | 4/2020 | Chen | |
| 10,699,149 B2 | 6/2020 | Bendall | |
| 10,740,913 B2 | 8/2020 | Shi | |
| 10,742,958 B2 | 8/2020 | Yamamoto | |
| 10,775,315 B2 | 9/2020 | Mekala | |
| 10,835,102 B2 | 11/2020 | Ganapati | |
| 10,909,702 B2 | 2/2021 | Ono | |
| 11,022,560 B2 | 6/2021 | Kato | |

| | | | |
|---|---|---|---|
| 11,084,169 B2 | 8/2021 | Graham | |
| 11,116,050 B1 | 9/2021 | Bhogal | |
| 11,288,789 B1 | 3/2022 | Chen | |
| 11,410,298 B2 | 8/2022 | Finn | |
| 11,994,476 B2 | 5/2024 | Li | |
| 2001/0030744 A1* | 10/2001 | Chang | G01N 21/8806 250/559.36 |
| 2002/0009218 A1 | 1/2002 | Chapman | |
| 2002/0193664 A1* | 12/2002 | Ross | A61B 1/0676 600/179 |
| 2003/0234941 A1 | 12/2003 | Mundy | |
| 2005/0234296 A1 | 10/2005 | Saadat | |
| 2005/0281520 A1* | 12/2005 | Kehoskie | G02B 23/2492 385/117 |
| 2005/0288555 A1 | 12/2005 | Binmoeller | |
| 2006/0183977 A1 | 8/2006 | Ishigami | |
| 2008/0240491 A1 | 10/2008 | Hori | |
| 2009/0092278 A1 | 4/2009 | Doi | |
| 2009/0167847 A1 | 7/2009 | Doi | |
| 2010/0128115 A1 | 5/2010 | Nakano | |
| 2010/0150406 A1 | 6/2010 | Xiao | |
| 2011/0018987 A1 | 1/2011 | Doi | |
| 2011/0221877 A1 | 9/2011 | Hori | |
| 2012/0019653 A1 | 1/2012 | Hori | |
| 2012/0327252 A1 | 12/2012 | Nichols | |
| 2013/0093866 A1 | 4/2013 | Ohlhues | |
| 2013/0135457 A1 | 5/2013 | Kell | |
| 2014/0002630 A1 | 1/2014 | Yokota | |
| 2014/0055604 A1 | 2/2014 | Delaney | |
| 2014/0098091 A1 | 4/2014 | Hori | |
| 2014/0133697 A1 | 5/2014 | Singamsetti | |
| 2014/0152790 A1* | 6/2014 | Saito | A61B 5/1459 348/68 |
| 2014/0207419 A1 | 7/2014 | Messinger | |
| 2015/0168263 A1 | 6/2015 | Mueller | |
| 2015/0317816 A1 | 11/2015 | Bendall | |
| 2016/0073855 A1 | 3/2016 | Farr | |
| 2016/0221262 A1 | 8/2016 | Das | |
| 2016/0266046 A1* | 9/2016 | Kuai | G01N 21/8806 |
| 2016/0284084 A1 | 9/2016 | Gurcan | |
| 2016/0284103 A1 | 9/2016 | Huang | |
| 2017/0318205 A1 | 11/2017 | Duckett, III | |
| 2018/0003161 A1 | 1/2018 | Michini | |
| 2018/0013959 A1 | 1/2018 | Slavens | |
| 2018/0103246 A1 | 4/2018 | Yamamoto | |
| 2018/0114304 A1 | 4/2018 | Chen | |
| 2018/0180534 A1 | 6/2018 | Noda | |
| 2018/0289240 A1* | 10/2018 | Aoyama | A61B 1/000094 |
| 2019/0220968 A1 | 7/2019 | Kato | |
| 2019/0228514 A1 | 7/2019 | Hestand | |
| 2019/0279380 A1 | 9/2019 | Bendall | |
| 2019/0330997 A1 | 10/2019 | Norton | |
| 2019/0338666 A1 | 11/2019 | Finn | |
| 2019/0339165 A1 | 11/2019 | Finn | |
| 2019/0340805 A1 | 11/2019 | Xiong | |
| 2019/0362486 A1* | 11/2019 | Diao | G06T 7/0004 |
| 2020/0056501 A1 | 2/2020 | Eastment | |
| 2020/0082526 A1 | 3/2020 | Murphy | |
| 2020/0213563 A1 | 7/2020 | Morice | |
| 2020/0319119 A1 | 10/2020 | Peters | |
| 2020/0346310 A1 | 11/2020 | Huttner | |
| 2021/0132598 A1 | 5/2021 | Schleif | |
| 2021/0172837 A1 | 6/2021 | Pulisciano | |
| 2021/0281748 A1 | 9/2021 | Nogami | |
| 2021/0312702 A1 | 10/2021 | Holzer | |
| 2021/0396683 A1 | 12/2021 | Zhang | |
| 2022/0051395 A1 | 2/2022 | Vandam | |
| 2022/0061638 A1 | 3/2022 | Hinding | |
| 2022/0314430 A1 | 10/2022 | Graham | |
| 2022/0358638 A1* | 11/2022 | Ojima | H04N 23/56 |
| 2023/0000328 A1 | 1/2023 | Govrin | |
| 2023/0016982 A1 | 1/2023 | Graham | |
| 2023/0018458 A1 | 1/2023 | Graham | |
| 2023/0018554 A1 | 1/2023 | Graham | |

(56)　　　References Cited

U.S. PATENT DOCUMENTS

| | | | | |
|---|---|---|---|---|
| 2023/0334644 A1 | 10/2023 | Ojima | | |
| 2024/0163537 A1 | 5/2024 | Kommareddy | | |

FOREIGN PATENT DOCUMENTS

| | | | | |
|---|---|---|---|---|
| CN | 102944928 | | 2/2013 | |
| CN | 102944928 B | * | 7/2015 | ............ G01B 11/24 |
| CN | 105960569 | | 9/2016 | |
| CN | 106416225 | | 2/2017 | |
| CN | 106934794 | | 7/2017 | |
| CN | 110047103 | | 7/2019 | |
| CN | 111433574 | | 7/2020 | |
| CN | 112136154 | | 12/2020 | |
| CN | 214368947 | | 10/2021 | |
| CN | 214965296 | | 12/2021 | |
| EP | 2170565 | | 4/2010 | |
| EP | 3643451 | | 4/2020 | |
| EP | 3643452 | | 4/2020 | |
| FR | 2965388 B1 | | 10/2012 | |
| JP | 2009168499 A | | 7/2009 | |
| JP | 2009282379 A | | 12/2009 | |
| JP | 2010008394 A | | 1/2010 | |
| JP | 2011161019 A | | 8/2011 | |
| JP | 5186314 B2 | | 4/2013 | |
| JP | 2013059664 | | 4/2013 | |
| JP | 5307407 B2 | | 10/2013 | |
| JP | 5361246 B2 | | 12/2013 | |
| JP | 5390011 | | 1/2014 | |
| JP | 5602449 B2 | | 10/2014 | |
| JP | 2017040932 A | | 2/2017 | |
| JP | 6373322 B2 | | 8/2018 | |
| JP | 6810711 | | 1/2021 | |
| WO | 2009144729 | | 12/2009 | |
| WO | 2020110576 | | 6/2020 | |
| WO | 2020219076 | | 10/2020 | |
| WO | 2021094534 | | 5/2021 | |

OTHER PUBLICATIONS

U.S. Appl. No. 17/373,925; Final Rejection mailed Feb. 11, 2025; (pp. 1-15).

U.S. Appl. No. 17/373,920; Final Rejection mailed Nov. 4, 2024; (pp. 1-24).

U.S. Appl. No. 17/373,917; Final Rejection mailed Apr. 16, 2024; (pp. 1-22).

Lim Ser Nam et al: "Automatic Registration of Smooth Object Image to 3D CAD Model for Industrial Inspection Applications", 2013 International Conference on 3D Vision, IEEE, Jun. 29, 2013 (Jun. 29, 2013), pp. 79-86, XP032480418, DOI: 10.1109/3DV.2013. 19.

Jason Geng: "Structured-light 3D surface imaging: a tutorial", Advances in Optics and Photonics, vol. 3, No. 2, Mar. 31, 2011 (Mar. 31, 2011), p. 128-160, XP055033088, DOI: 10.1364/AOP.3. 000128.

U.S. Appl. No. 17/985,459, filed Nov. 11, 2022, entitled "Inspection Systems and Methods Employing Directional Light for Enhanced Imaging".

U.S. Appl. No. 17/373,920; Non-Final Rejection mailed Sep. 28, 2023; (pp. 1-17).

U.S. Appl. No. 17/985,459; Non-Final Rejection mailed Sep. 20, 2024; (pp. 1-22).

U.S. Appl. No. 17/373,925; Non-Final Rejection mailed Aug. 26, 2024; (pp. 1-17).

U.S. Appl. No. 17/985,459; Non-Final Rejection mailed Mar. 27, 2025; (pp. 1-17).

Waygate Technologies, Everest Mentor Visual iQ+ VideoProbe product specification, Jan. 2024, 12 pp.

U.S. Appl. No. 17/985,459; Final Rejection mailed Jan. 15, 2025; (pp. 1-17).

U.S. Appl. No. 17/373,917; Non-Final Rejection mailed Aug. 1, 2024; (pp. 1-25).

U.S. Appl. No. 17/373,920; Non-Final Rejection mailed Jun. 7, 2024; (pp. 1-20).

U.S. Appl. No. 17/373,917; Non-Final Rejection mailed Nov. 16, 2023; (pp. 1-16).

U.S. Appl. No. 17/373,920; Final Rejection mailed Feb. 12, 2024; (pp. 1-20).

U.S. Appl. No. 17/373,925; Non-Final Rejection mailed Nov. 14, 2023; (pp. 1-12).

U.S. Appl. No. 17/373,925; Final Rejection mailed Mar. 25, 2024; (pp. 1-14).

U.S. Appl. No. 17/985,459; Notice of Allowance mailed Jul. 1, 2025; (pp. 1-8).

U.S. Appl. No. 17/373,920; Final Rejection mailed Jun. 4, 2025; (pp. 1-28).

U.S. Appl. No. 17/373,925; Non-Final Rejection mailed Jun. 17, 2025; (pp. 1-19).

U.S. Appl. No. 17/373,925; Non-Final Rejection mailed Jun. 17, 2025; (pp. 1-26).

U.S. Appl. No. 17/985,459; Notice of Allowance and Fees Due (PTOL-85) mailed Jul. 1, 2025; (pp. 1-8).

U.S. Appl. No. 17/985,501; Non-Final Rejection mailed May 14, 2025; (pp. 1-44).

Waygate Technologies Brochure: Everest Mentor Visual iQ+ VideoProbe; 12 pgs.; Oct. 2024; (extension://efaidnbmnn-nibpcajpcglclefindmkaj/https://dam.bakerhughes.com/m/206c48e427981e2f/original/BHCS33632B-Mentor-ViQ-Brochure_R8-pdf.pdf).

U.S. Appl. No. 17/373,917; Non-Final Rejection mailed Aug. 11, 2025; (pp. 1-23).

U.S. Appl. No. 17/373,925; Notice of Allowance and Fees Due (PTOL-85) mailed Oct. 27, 2025; (pp. 1-7).

U.S. Appl. No. 17/985,459; Notice of Allowance and Fees Due (PTOL-85) mailed Nov. 26, 2025; (pp. 1-8).

* cited by examiner

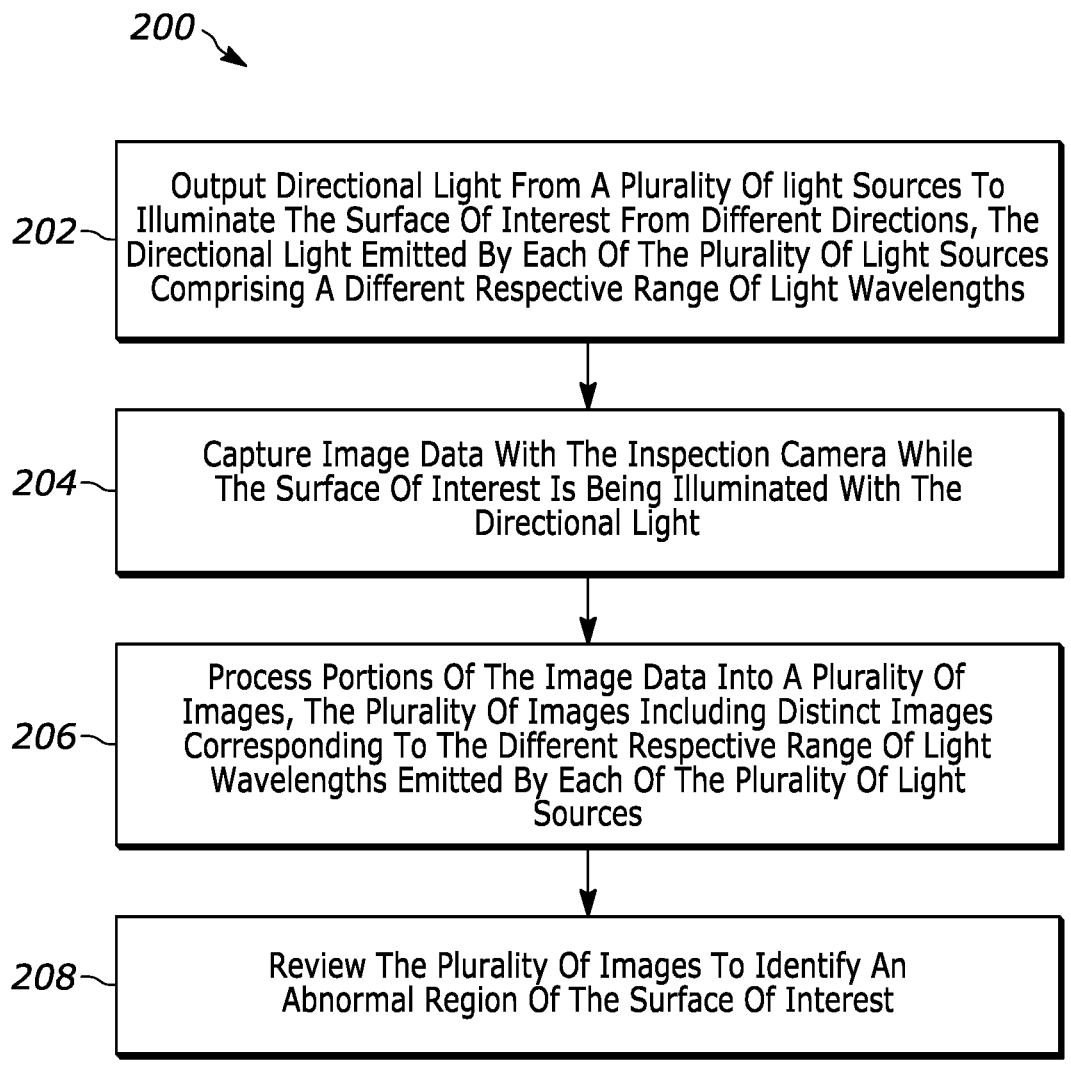

*200*

*202* — Output Directional Light From A Plurality Of light Sources To Illuminate The Surface Of Interest From Different Directions, The Directional Light Emitted By Each Of The Plurality Of Light Sources Comprising A Different Respective Range Of Light Wavelengths

*204* — Capture Image Data With The Inspection Camera While The Surface Of Interest Is Being Illuminated With The Directional Light

*206* — Process Portions Of The Image Data Into A Plurality Of Images, The Plurality Of Images Including Distinct Images Corresponding To The Different Respective Range Of Light Wavelengths Emitted By Each Of The Plurality Of Light Sources

*208* — Review The Plurality Of Images To Identify An Abnormal Region Of The Surface Of Interest

FIG. 21

INSPECTION SYSTEMS AND METHODS EMPLOYING DIFFERENT WAVELENGTH DIRECTIONAL LIGHT FOR ENHANCED IMAGING

CROSS REFERENCE TO RELATED APPLICATIONS

This application is related to U.S. patent application Ser. No. 17/985,459, filed on Nov. 11, 2022, entitled, "Inspection Systems and Methods Employing Directional Light For Enhanced Imaging" the entirety of which is incorporated herein by reference.

TECHNICAL FIELD

These teachings relate generally to inspection systems for mechanical systems, devices, and objects including machine components, jet engines, and the like.

BACKGROUND

Complex devices can develop wear and tear from general use that can degrade performance of the devices and, in some instances, lead to unintended operational failure. This wear and tear can occur at various locations of the devices including hard to inspect interior areas. As such, imaging systems such as borescopes and the like are used to image these internal areas for proper inspection.

BRIEF DESCRIPTION OF THE DRAWINGS

Various needs are at least partially met through provision of the inspection systems and methods employing different wavelength directional light for enhanced imaging described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 21 comprises a flow diagram of a method in accordance with various embodiments of these teachings.

Figure 1:
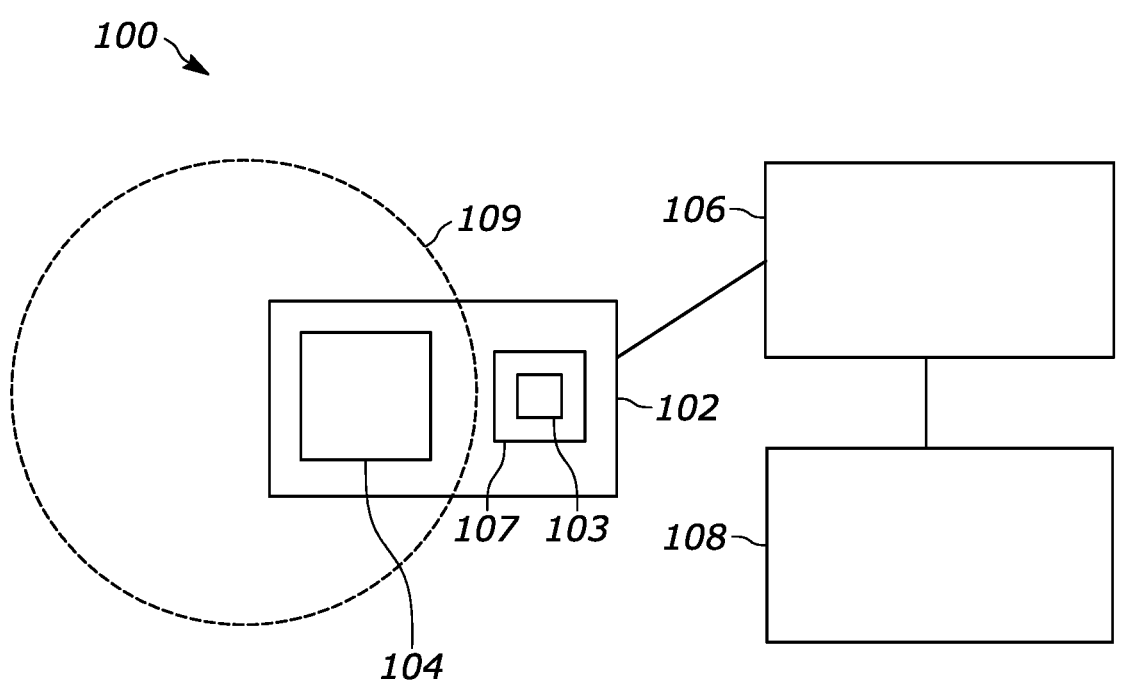
FIG. 1 comprises an inspection system for a device in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Current inspection systems for devices such as jet engines and the like typically include a single camera inspection borescope having a lighting arrangement configured to broadcast diffuse light. This diffused lighting arrangement can provide a uniform intensity of light across an interior or other surface of the device into which the borescope is inserted. However, the probability of detecting wear and tear problems such as cracks and other distress on the devices may be reduced by the uniform intensity of the diffused light.

Borescopes may also employ imaging sensors or devices to present an operator with an image of an interior surface of a device, and/or to record such an image for later recall. The use of light sources positioned adjacent to the primary lens of the imaging sensors or devices often results in an even illumination of the surface, which is sometimes described as a "flat illumination." However, it may be difficult to discern surface contours in images taken under this "flat illumination" condition due to the lack of variation of surface illumination. In particular, the "flat illumination" may make it difficult to see certain features or defects such as thin cracks. However, the various aspects of the present disclosure can overcome this deficiency by employing light that is offset in a range of between about 3 mm and about 30 mm from the imaging sensor or device, so as to create differences of illumination over the interior surface. Specifically, employing offset directional (e.g. non-diffused) lights as described herein, in which the illumination varies with the angles between the lights and the surface being illuminated and the camera and the surface being illuminated, can greatly increase contrast in images as compared with standard diffuse light illumination. In particular, defects or other sharp edged features may even throw or cast shadows in the image as a result of the emitted directional light, which greatly increases the contrast of such sharp edged features in the image.

Generally speaking, the various aspects of the present disclosure can be employed with an inspection system for a device and related methods. The inspection system and methods described herein are used to detect surface anomalies by illuminating the surface from different directions. This directional lighting enhances the ability of the vision system to detect the anomalies. The inspection system can include an inspection camera, a plurality of light sources collocated with the inspection camera, a controller electrically coupled to the inspection camera and the plurality of light sources, and a post processing system. Each of the plurality of light sources can be configured to output directional light that has a different direction with respect to the scene or surface of interest being examined. For example, each of the plurality of light sources can be located at a different position around a central axis of the inspection camera and can have a respective primary axis that is angled to point towards the central axis of the inspection camera such that a surface of interest within a field of view of the inspection camera will receive from different directions and reflect back to the inspection camera light emitted from each of the plurality of light sources. Further, the directional light emitted by each of the plurality of light sources can comprise a different respective range of light wavelengths that are simultaneously output to illuminate a scene comprising a surface of interest. Further still, the inspection camera can be configured to capture image data while the surface of interest is being illuminated with the directional light output form the plurality of light sources.

The post processing system can be configured to receive the image data and process portions of the image data into a plurality of images that include distinct images corresponding to the different respective range of light wavelengths output from each of the plurality of light sources. In this way, the post processing system can produce images showing directional light conditions such as shadows cast by the surface of interest under the directional light conditions from image data captured while each of the different light sources were illuminating the surface of interest. Further, the post processing system can also process the plurality of images to identify an abnormal region of the surface of interest and/or present one or more of the plurality of images on a display such that an operator can identity the abnormal region of the surface of interest. From the image data and the plurality of images generated therefrom, the post processing system can extract directional light inferencing from both moving and static objects within a field of view of the inspection camera.

In general, the directionally broadcast and different wavelength light and post processing procedures described herein can improve the resolution of features in images of the part to be inspected. In general, the directionally broadcast light and post processing procedures can provide enhanced contrast images of the part to be inspected. Such enhancement can also be with respect to the ability to discern minute surface variation and defects in the device. Furthermore, use of the different wavelengths of light enables simultaneous and continuous illumination of the surface of interest while maintaining the ability to extract directional aspects of the broadcast light. For example, existing color filters such as a Bayer filter on a sensor of the inspection camera can be leveraged to extract and process each different wavelength of light separately. This approach can produce a faster process than illuminating the surface of interest with sequenced directional light, and can also be practically used to image moving objects, because every discrete frame of data captured by the sensor of the inspection camera can form a single composite color image having each of the different wavelengths of light and their corresponding different directionality included therein.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. Referring now to the drawings, and in particular to FIG. 1, an inspection system 100 that is compatible with many of these teachings will now be presented. The inspection system 100 can include an inspection camera 102, a lighting array 104 collocated with the inspection camera 102, a controller 106 electrically coupled to the inspection camera 102 and the lighting array 104, and a post processing system 108. In some embodiments, the inspection camera 102, including the collocated lighting array 104, can be sized and shaped to be fed into an interior of a device 109. Device 109 can include a mechanical system, device, or object such as machine components, jet engines, or the like. However, alternative embodiments where the inspection camera 102 is configured to capture images of an exterior of the device 109 without being inserted into the interior thereof are also contemplated. In some embodiments, the inspection system 100 can include a borescope or similar small maneuverable camera that comprises the inspection camera 102. However, various other sized cameras are also contemplated.

Figure 2:
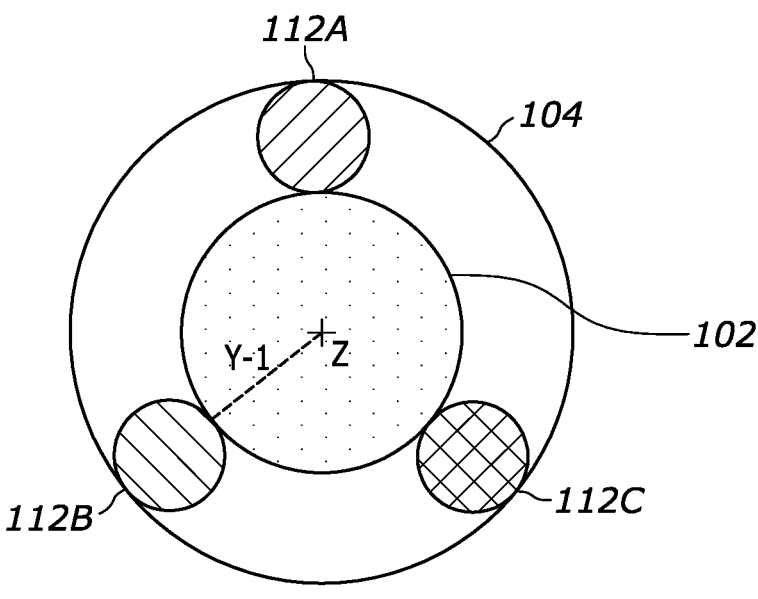
FIG. 2 comprises a front view of a light ring and front camera arrangement as configured in accordance with various embodiments of these teachings.
Figure 3:
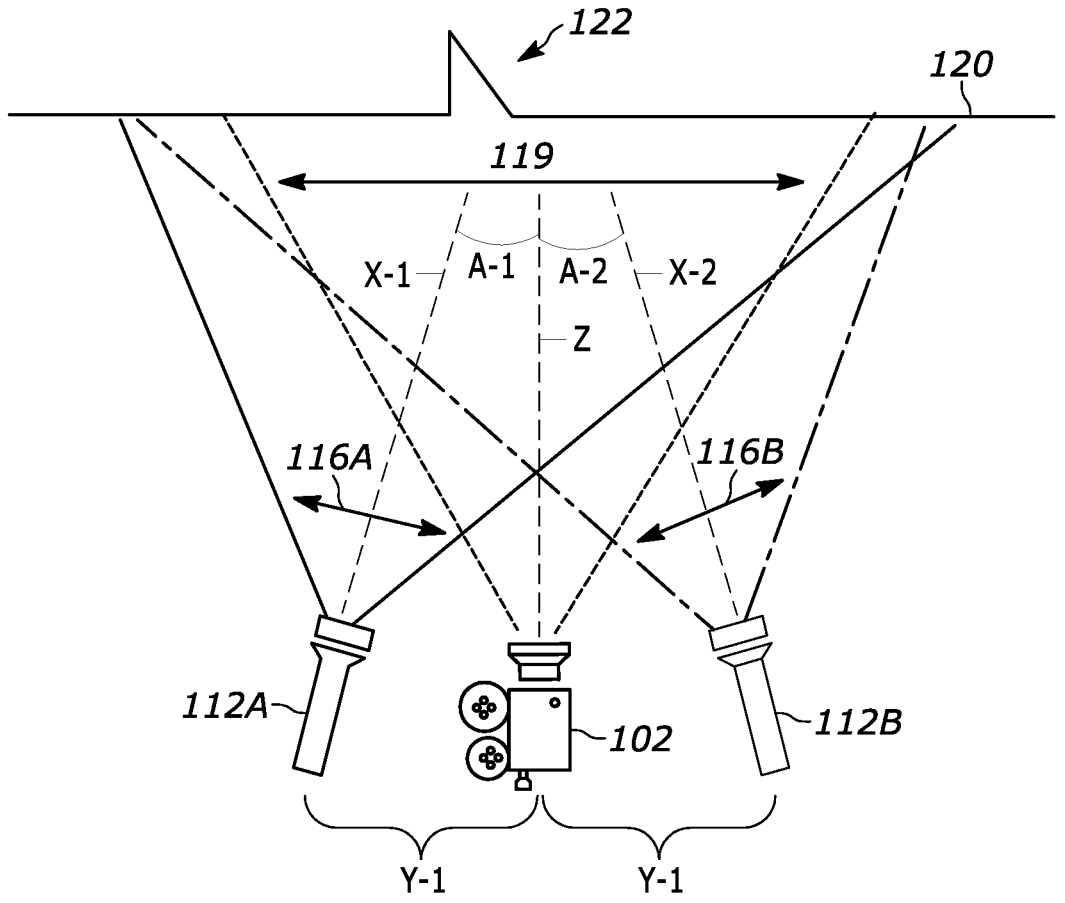
FIG. 3 comprises a schematic diagram of directional light of different wavelengths being emitted onto a surface of interest in accordance with various embodiments of these teachings.

With reference to FIGS. 2 and 3, the lighting array 104 can include a plurality of light sources 112, each configured to emit a different respective range of light wavelengths. Each different respective range of light wavelengths can be concentrated around a different peak wavelength, for example, green, red, and blue light. In some embodiments, the different respective ranges of light wavelengths emitted from each of the light sources can be configured to have minimal to no spectral overlap. Further, the peak wavelength or a working wavelength of each of the light sources 112 can be chosen in such a way that they have minimal spectral overlap with a response for different channels 103 of a sensor 107 of the inspection camera 102.

For example, where the light sources 112 include distinct green, red, and blue light emitting diodes (LEDS) positioned around the inspection camera 102, the green LED can emit light having a wavelength between approximately 520 and 555 nano meters, the red LED can emit light having a wavelength between approximately 640 and 700 nano meters, and the blue LED can emit light having a wavelength between approximately 450 and 480 nano meters. In this way, the different channels of the sensor can separately capture each of the different wavelengths of light for efficient post processing by the post processing system 108.

Further, because each of the light sources is positioned at a different location around the inspection camera 102, the image data for each range of light wavelengths that is separately captured in each sensor channel 103 will also have a distinct directional component imparted thereon as a result of the different location of light source emitting that range of light wavelengths. For example, with reference to FIG. 3, light sources 112A and 112B of the plurality of light sources 112 can emit different light wavelength directional light onto a surface of interest 120. As seen in FIG. 3, the plurality of light sources 112 can be placed a distance Y-1 from the central axis Z of the inspection camera 102 and can have different directional patterns 116A and 116B around respective central axes X-1 and X-2 thereof and relative to a field of view 119 of the inspection camera 102 and the surface of interest 120. The axes X-1 and X-2 can be angled with respect to the central axis Z of the inspection camera 102 so as to form angles A-1 and A-2. Further, the different directionality of the patterns 116A and 116B can cast different shadows onto the surface of interest 120. The differing shadow data can heighten the viewability of an anomaly 122 on the surface of interest 120 in images that correspond to the light emitted from light sources 112A and 112B and that are extracted and compiled from the image data captured by the inspection camera 102.

As described above, the inspection camera 102 can include a sensor 107 that includes distinct channels 103 configured to capture the different respective ranges of light wavelengths emitted by the light sources 112. However, it will be appreciated that other different arrangements for the inspection camera 102 are also contemplated. For example, in some embodiments, the inspection camera 102 can instead comprise distinct sensor elements dedicated to each of the different respective ranges of light wavelengths emitted by the light sources 112 (e.g. a 3CCD camera system or the like). In these embodiments, various combinations of color filters, other filters, beam splitters, pentaprisms, and other optical components can be utilized to direct the light reflected off of the surface of interest into each of the distinct sensor elements. Further still, in some embodiments, the inspection camera 102 can include a monochromatic sensor with different tunable color filters corresponding to each of the different respective ranges of light wavelengths emitted by the light sources. As described herein, these light wavelengths may be in the visible or non-visible spectrum.

Various embodiments for the controller 106 are contemplated, such as simple electric or mechanical switches, microcontrollers, computer processors, and other similar devices known to those of skill in the art. In some embodiments, the controller 106 can comprise separate distinct respective circuitry, components, etc. for directing the operation of the inspection camera 102 and the lighting array 104. In some embodiments, the controller 106 can be omitted. However when the controller 106 is present the controller 106 can be configured to direct the plurality of light sources of lighting array 104 to output the directional light that illuminates a surface of interest of the device 109. Further, the controller 106 can be configured to direct the inspection camera 102 to capture image data while the surface of interest is being illuminated with the different wavelengths of light either simultaneously or independently.

Further, the post processing system 108 is configured to receive the image data and process portions of the image data from each of the sensor channels 103 into a plurality of images that include distinct images corresponding to the different respective range of light wavelengths emitted by each of the plurality of light sources. Further, the post processing system 108 can review or process the plurality of images to identify an abnormal region of the surface of interest. In some embodiments, the controller 106 is also the post processing system 108. However additional embodiments are contemplated where the controller 106 is both distinct from the post processing system 108 and performs one or more of the processes described herein as being performed by the post processing system 108. Further still, in some embodiments, the post processing system can include a display device that presents one or more of the plurality of images thereon such that an operator can identity the abnormal region of the surface of interest.

In some embodiments, the lighting array 104 can be added to an existing vision system or inspection camera such as a borescope or the like without changing the footprint of such systems. Borescopes typically include an image sensor or camera (such as the inspection camera 102). The borescope may be inserted through a long flexible or rigid insertion tool such as a tube to position the camera at an end of the insertion tool. The end of the tube is small and narrow and can be fed into difficult to reach locations such as the inside of objects or mechanical devices such as jet engines, gas turbines, and the like. The image sensor or camera then relays image data captured thereby back to an eyepiece and/or a display where the inside of the objects or mechanical device can be viewed and magnified.

In some embodiments, the lighting array 104 can be arranged on a guide tube 105 (see FIGS. 2 and 4-13) which may be used to position the image sensor or camera (e.g. the inspection camera 102) of the long flexible or rigid borescope insertion tool. The guide tube 105 is used to position the borescope at a desired location internal to the device or object being inspected. By mounting the lighting array 104 on the guide tube 105, a standard borescope may be employed with the added benefit of offsetting the one or more illumination sources from the image sensor or camera.

The lighting array 104 can also be used in conjunction with snake-arm robots such as those disclosed in US Patents U.S. Pat. No. 8,069,747B2, U.S. Pat. No. 7,543,518B2, U.S. Ser. No. 11/084,169B2 and European *Patens* EP2170565B1, EP3643451A1, EP3643452A1, each of which is is incorporated by reference in their entirety. Snake-arm robots, like borescopes, can be used for inspection of confined spaces. Snake-arm robots are electro-mechanical devices comprising an arm with high degrees of freedom that can be controlled in a snake like manner to follow a contoured path and avoid obstacles. A snake arm robot typically includes a sequence of links that are driven by one or more motors and can move relative to one another to change the shape or curvature of the extension arm. In some embodiments, the inspection system 100 may include a rigid or flexible elongated extension element that is sized and shaped to insert the inspection camera 102 and the lighting array 104 into a confined space, such as the interior of a jet engine, to perform inspection. It will also be appreciated that the lighting array 104 can be deployed in conjunction with non-confined space vision systems used to identify surface anomalies on an accessible portion of an object, for example, in a photo studio setting or the like.

Illuminating the interior of the device 109 with directional light has several advantages. For example, oblique directional lighting such as the different directional patterns 116A and 116B shown in FIG. 3 can enhance the ability to detect minute surface variations such as the anomaly 122 on the surface of interest 120. In particular, directional lighting as described herein enables the inspection system 100 to exploit the effects of surface texture, height, gradient of the surface, and angle of the each light source to a normal of the surface of interest 120 at each point, as well as the distance of the inspection camera 102 to the surface of interest and the angle between the camera ray and light source ray (e.g. angles A-1 and A-2) at each pixel in the images. Thus, illuminating the surface of interest from different directions reveals regions and/or produces shadows which are not seen through diffused lighting.

For example, shadows cast from the directional light as a result of surface height gradient vary for debris on the surface of interest vs a dent or crack formation in the surface of interest. Further, use of the simultaneously output wavelengths of light from different directions around the inspection camera 102 can better identify cracks or other abnormalities that lie in the same plane with the light sources and camera when compared with using sequenced directional light of the same wavelength. Thus, the use of directional and minimally overlapping different respective ranges of light wavelengths described herein enables easy extraction or recognition of different surface features. Further, utilizing different respective ranges of light wavelengths for each light source enables the inspection system 100 to capture different directional light while simultaneously illuminating the surface of interest of the device 109. This simultaneous illumination can eliminate any requirement to sequentially emit light and synchronize such sequencing with the capture rate of the inspection camera 102. Furthermore, it enables the capture of moving objects without correcting for motion adjustments as is typically done when sequencing with a capture rate.

Figure 4:
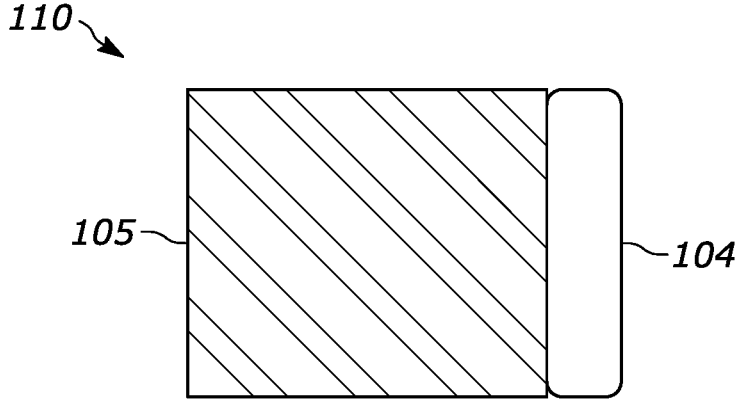
FIG. 4 comprises a partial side view of a light ring and front camera arrangement as configured in accordance with various embodiments of these teachings.
Figure 5:
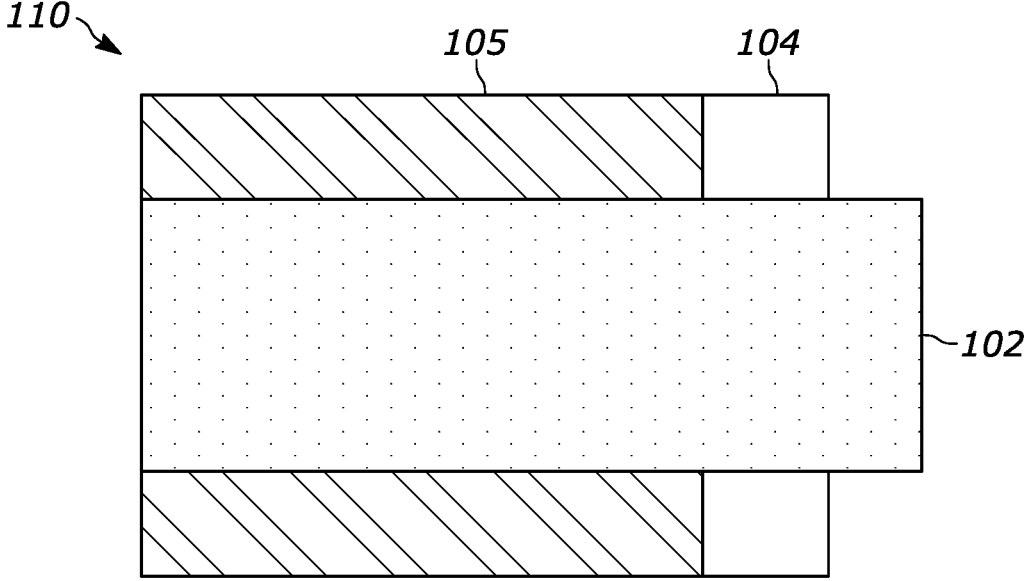
FIG. 5 comprises a cross-sectional side view of light ring and front camera arrangement as configured in accordance with various embodiments of these teachings.
Figure 6:
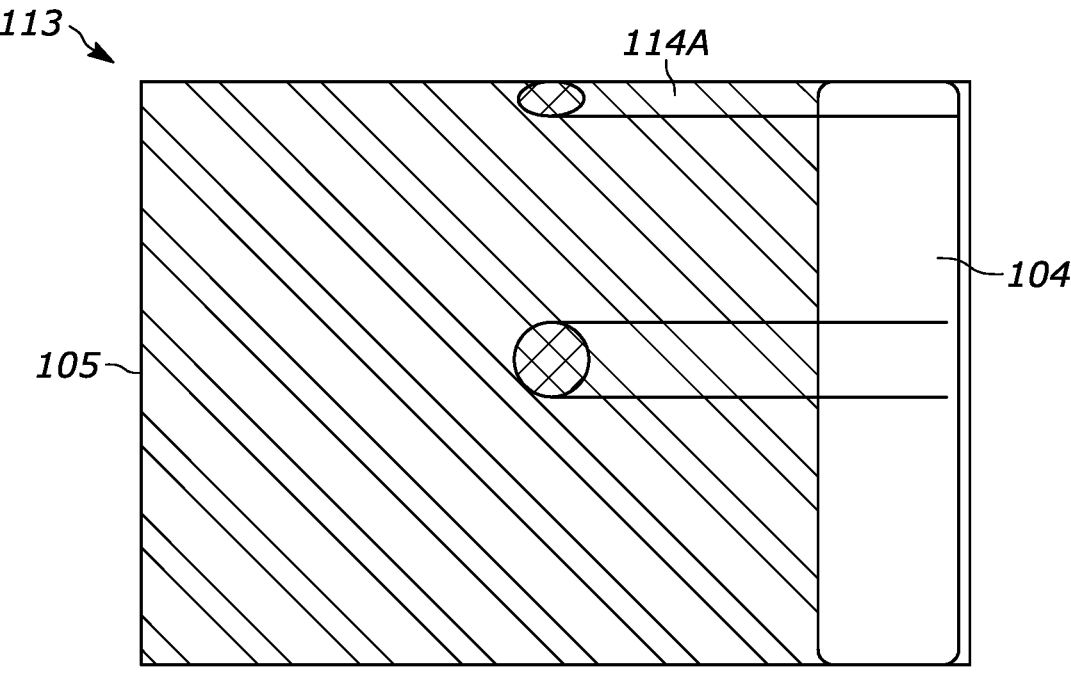
FIG. 6 comprises a partial side view of an extendable light ring and front camera arrangement as configured in accordance with various embodiments of these teachings.
Figure 7:
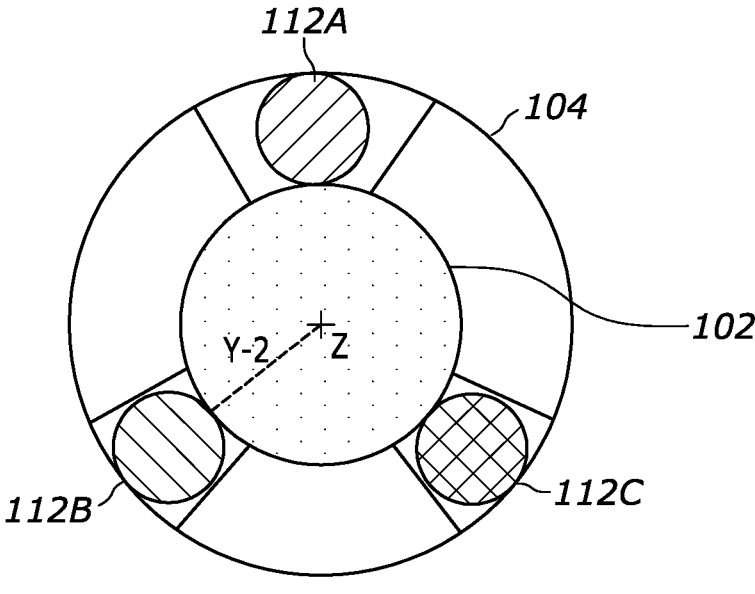
FIG. 7 comprises a front view of an extendable light ring and front camera arrangement as configured in accordance with various embodiments of these teachings.
Figure 8:
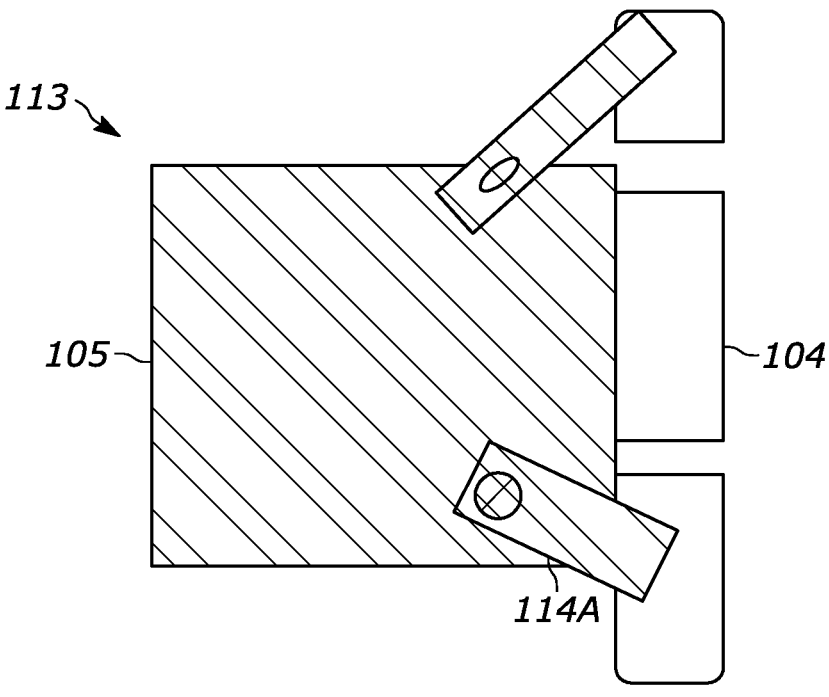
FIG. 8 comprises a partial side view of an extendable light ring and front camera arrangement as configured in accordance with various embodiments of these teachings.

Turning now to FIGS. 2 and 4, partial front and side views of a light ring and front camera arrangement 110 are shown respectively. The light ring and front camera arrangement 110 can include the inspection camera 102 with the lighting array 104 configured as a light ring attached to the guide tube 105 and positioned around a front face of the inspection camera 102. As seen in FIG. 2, the lighting array 104 can include a plurality of light sources 112A, 112B, and 112C placed in an annular geometry around the inspection camera 102. Specifically, the light sources 112A, 112B, and 112C can be respectively positioned at approximately (Y-1, 90°), (Y-1) 210°, and (Y-1, 330°) in polar coordinates relative to the central axis Z of the inspection camera 102. In some embodiments Y-1 can be in a range of between about 3 mm and about 30 mm. Further, FIG. 5 is a partial cross-section of light ring and front camera arrangement 110. As seen in FIG. 5, the inspection camera 102 can reside inside the guide tube 105. Further still, in some embodiments, the distal end of the inspection camera 102 that includes a sensor or other viewing elements of the inspection camera 102 can extend outward from the guide tube 105 past the lighting array 104. Extending the inspection camera 102 outward from the guide tube 105 can alter the distance Y-1 that the light sources 112A, 112B, and 112C are positioned relative to the inspection camera 102 so as to change the angles between the central axis Z and the central axes of the light sources 112A, 112B, and 112C.

Turning now to FIGS. 6-9 partial side and front views of an extendable light ring and front camera arrangement 113 are shown in FIGS. 6 and 8 and FIGS. 7 and 9 respectively. The extendable light ring and front camera arrangement 113 can include the inspection camera 102 with the lighting array 104 configured as an extendable light ring that is selectively deployable with respect to the guide tube 105 by arms 114A from a resting position concentric around the inspection camera 102 at a distance Y-2 (see FIGS. 6 and 7) into an extended position (see FIGS. 8 and 9). Specifically, the light source 112A, 112B, and 112C can be respectively positioned at approximately (Y-2, 90°), (Y-2,210°), and (Y-2, 330°) in polar coordinates relative to the central axis Z of the inspection camera 102 when in the resting position.

Figure 9:
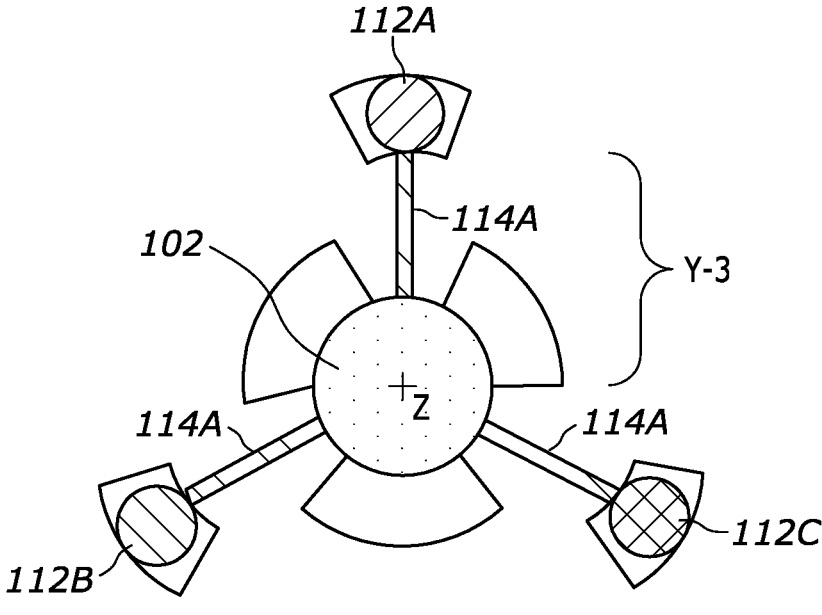
FIG. 9 comprises a front view of an extendable light ring and front camera arrangement as configured in accordance with various embodiments of these teachings.

As seen in FIG. 9, when deployed in the extended position, the lighting array 104 can include the plurality of light sources 112A, 112B, and 112C disposed in annular geometry around and extended out a distance Y-3 from the inspection camera 102 (e.g., a distance from the resting position). Specifically, the light source 112A, 112B, and 112C can be respectively positioned at approximately (Y-3, 90°), (Y-3,210°), and (Y-3, 330°) in polar coordinates relative to the central axis Z of the inspection camera 102 when in the extended position. In some embodiments Y-3 can be greater than Y-2 and in a range of between about 3 mm and about 30 mm. Offsetting the light sources 112A, 112B, and 112C from the inspection camera 102 by the distance Y-3 can increase the angle between the direction of illumination of a point on the surface of interest 120 by at least one of the light sources 112A, 112B, 112C (e.g. from a light ray of one of the light sources 112A, 112B, 112C) and the direction of imaging of the same point on the surface of interest 120 by the inspection camera 102 (e.g. a light ray reflected back into the inspection camera 102). This increase in angle can in turn heighten the differences recorded into the image data that is used by the post processing system 108 to identify the abnormal regions of the device 109 such as the anomaly 122 (See FIG. 3).

As seen in FIGS. 6-9 the extension mechanism that comprises the arms 114A can be part of the guide tube 105. However, alterative arrangements where the extension mechanism is part of the borescope unit that comprises the inspection camera 102 are also contemplated. In some embodiments, the controller 106 can direct the deployment of the light sources 112 into the extended position. In some configurations, the plurality of light sources 112A, 112B, and 112C may be angled in so as to converge at a specified distance from the inspection camera 102 or lens thereof to optimize the illumination performance at the specified distance.

Figure 10:
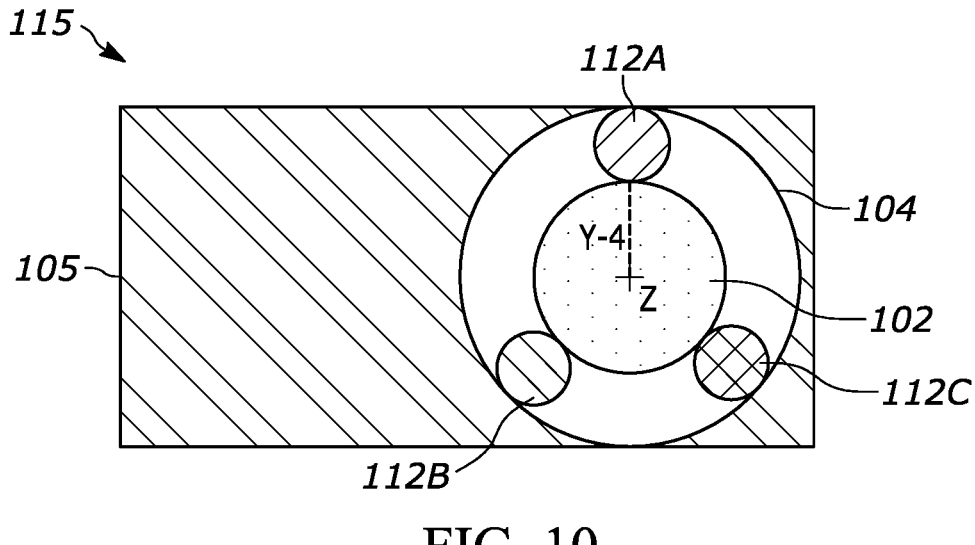
FIG. 10 comprises a partial side view of a side light ring and side camera arrangement as configured in accordance with various embodiments of these teachings.

Turning now to FIG. 10, a side light ring and side camera arrangement 115 is shown. The side light ring and side camera arrangement 115 is similar to the light ring and front camera arrangement 110 except that, for the side light ring and side camera arrangement 115, the inspection camera 102 and the lighting array 104 are disposed on a side area of a housing such as the guide tube 105 or the like instead of a front (e.g., end) area as with the light ring and front camera arrangement 110. Further, as with the light ring and front camera arrangement 110, the light sources 112A, 112B, and 112C of the side light ring and side camera arrangement 115 can be respectively positioned at approximately (Y-4, 90°), (Y-4,210°), and (Y-4, 330°) in polar coordinates relative to the central axis Z of the inspection camera 102. In some embodiments, Y-4 can be the same as Y-1 and can be in a range of between about 3 mm and about 30 mm.

Each of the plurality of light sources 112A, 112B, and 112C can be configured to output a different respective peak wavelength of light and corresponding range of light wavelengths around that peak. For example, in some embodiments, the light source 112A can output a peak wavelength of light associated with the color green, the light source 112B can output a peak wavelength of light associated with the color red, and the light source 112C can output a peak wavelength of light associated with the color blue. However, it will be appreciated that embodiments with fewer or additional light sources configured to emit additional visible and nonvisible light wavelengths are also contemplated. As described above, each of the light sources 112A, 112B, and 112C may emit light having a spectral range of wavelengths, and the specific wavelength of light output by each of the light sources 112A, 112B, and 112C can refer to the peak wavelength emitted thereby. In some embodiments, the different wavelengths of light separately emitted from each of the light sources can be configured to have minimal to no spectral overlap.

Figure 11:
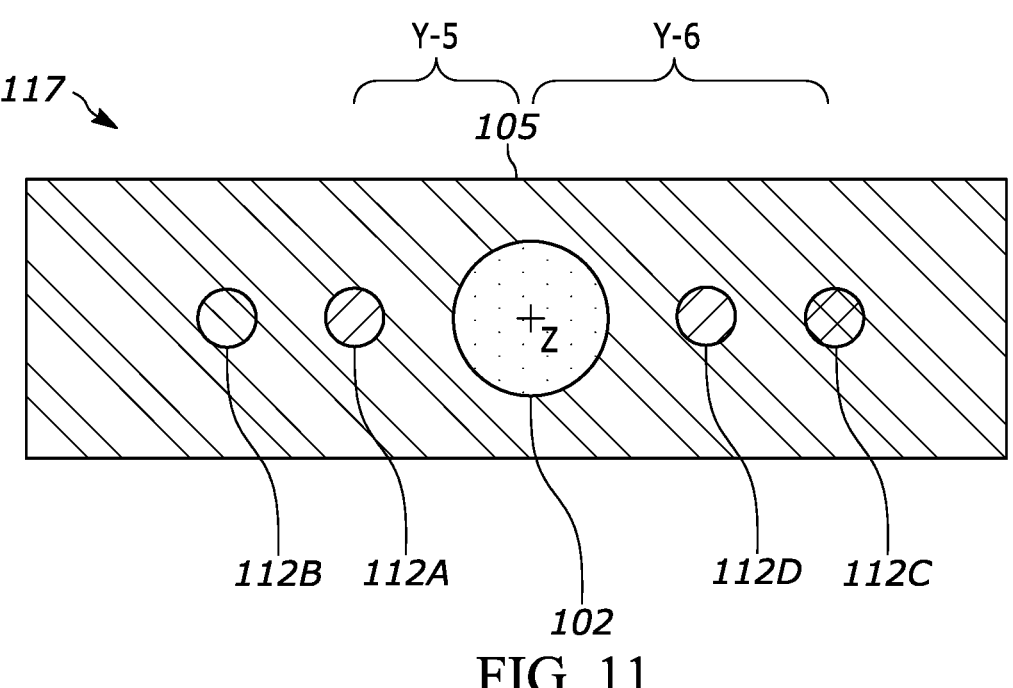
FIG. 11 comprises a partial side view of a linear light and side camera arrangement as configured in accordance with various embodiments of these teachings.

Turning now to FIG. 11, a linear light and side camera arrangement 117 is shown. The linear light and side camera arrangement 117 includes the inspection camera 102 and the light sources 112A, 112B, and 112C arranged on the guide tube 105 in a co-linear or line configuration with respect to the central axis Z of inspection camera 102. As seen in FIG. 11, in some embodiments, the linear light and side camera arrangement 117 can include an additional light source 112D that outputs the same peak and range of light wavelengths as the light source 112A. However, additional embodiments where the light source 112D outputs a different peak or range of light wavelengths from the light source 112A and/or the light sources 112B and 112C are also contemplated. The light sources 112A, 112B, 112C, and 112D can be respectively positioned at approximately (Y-5,180°), (Y-6,180°), (Y-5, 0°), and (Y-6, 330°) in polar coordinates relative to the central axis Z of the inspection camera 102. In some embodiments Y-5 can be less than Y-6 and both can be in a range of between about 3 mm and about 30 mm.

Figure 12:
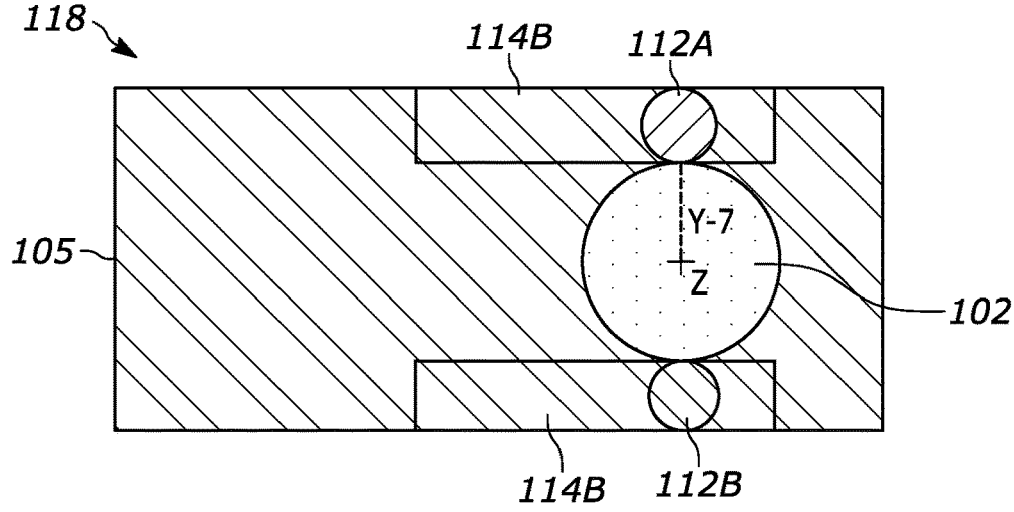
FIG. 12 comprises a partial side view of an extendable light and side camera arrangement as configured in accordance with various embodiments of these teachings.
Figure 13:
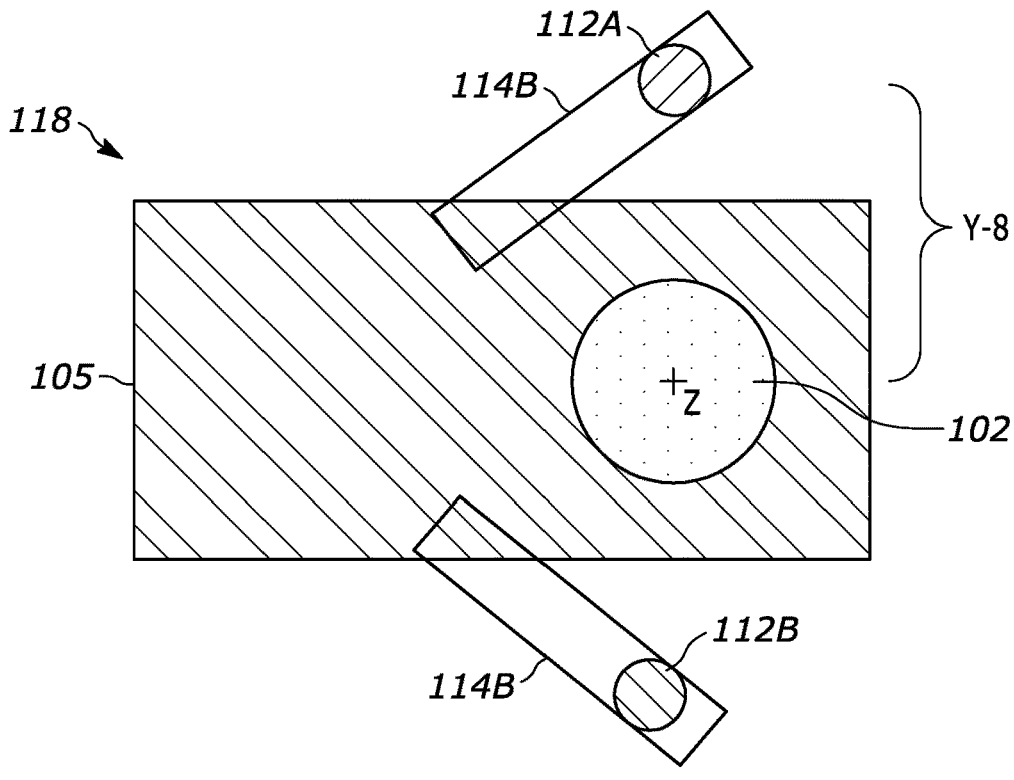
FIG. 13 comprises a partial side view of an extendable light and side camera arrangement as configured in accordance with various embodiments of these teachings.

Turning now to FIGS. 12 and 13 partial side and front views of an extendable light and side camera arrangement 118 are shown respectively. The extendable light and side camera arrangement 118 can include the inspection camera

102 with the light sources 112A and 112B being selectively deployable with respect to the guide tube 105 by arms 114B similar to the arms 114A of the extendable light ring and front camera arrangement 113. The arms 114B are configured to deploy the light sources 112A and 112B from a resting position above and below the inspection camera 102 (see FIG. 12) into an extended position (see FIG. 13). Specifically, the light source 112A and 112B can be respectively positioned at approximately (Y-7, 90°), (Y-7) 270° in polar coordinates relative to the central axis Z of the inspection camera 102 when in the resting position.

As seen in FIG. 13, when deployed in the extended position, the light sources 112A and 112B are disposed at a distance from the inspection camera 102. Specifically, the light source 112A and 112B can be respectively positioned at approximately (Y-8, 90°) and (Y-8, 270°) in polar coordinates relative to the central axis Z of the inspection camera 102 when in the extended position. In some embodiments Y-8 can be greater than Y-7 and in a range of between about 3 mm and about 30 mm. As with the extendable light ring and front camera arrangement 113, offsetting the light sources 112A and 112B from the inspection camera 102 by the distance Y-8 can increase the angle between the direction of illumination of a point on the surface of interest 120 by at least one of the light sources 112A and 112B (e.g. from a light ray of one of the light sources 112A, 112B, 112C) and the direction of imaging of the same point on the surface of interest 120 by the inspection camera 102 (e.g. a light ray reflected back into the inspection camera 102). The increase in the angle in turn can heighten the differences recorded into the image data that is used by the post processing system 108 to identify the abnormal regions of the device 109.

Further, the extension mechanism that comprises the arms 114B can be part of the guide tube 105 and/or part of a borescope unit that comprises the inspection camera 102. In some embodiments, the controller 106 can direct the deployment of the light sources 112A and 112B into the extended position via the arms 114B. Further, additional embodiments of the extendable light and side camera arrangement 118 that include the light source 112C and/or other additional light sources on one of the arms 114B and or on additional distinct arms are also contemplated.

With respect to the operation of the light ring and front camera arrangement 110, the extendable light ring and front camera arrangement 113, the side light ring and side camera arrangement 115, the linear light and side camera arrangement 117, and the extendable light and side camera arrangement 118, the plurality of the light sources 112A, 112B, 112C, and/or 112D are configured to simultaneously output the corresponding different peak and ranges of light wavelengths. Specifically, during inspection of the device 109 all the light sources 112A, 112B, 112C, and 112D are activated to each emit a different peak light wavelength and corresponding range of light wavelengths around that peak and are kept on while the image data of the surface of interest is captured by the inspection camera 102. In some embodiments, the light sources 112A, 112B, 112C, and 112D can include light emitting diodes (LEDs). Additional and alternative light sources such as lasers, fiberoptic light pipes, incandescent, etc. are also contemplated. It will also be appreciated that additional configurations for the lighting array 104 with more or fewer light sources than shown in FIGS. 2-11 are contemplated.

Additionally, in some embodiments, each of the plurality of light sources 112A, 112B, 112C, and/or 112D can include tunable light sources configured to change the respective peak and ranges of light wavelengths emitted thereby. Utilizing tunable light sources can enable the inspection system 100 to customize the peak and ranges of light wavelengths for different surfaces of interest based on the shape thereof, a specific direction of defect, etc. without needing to add additional light sources that specifically emit those different peak and ranges of light wavelengths. In these embodiments, the controller 106 can alter the peak and ranges of light wavelengths emitted from each of light sources 112A, 112B, 112C, and 112D by controlling signals sent to or the plurality of light sources 112A, 112B, 112C, and 112D. Such signals can include digital signals, analog signals, pulse width modulated signals, and other control signals for light sources known in the art. Further, in some embodiments, each of the light sources 112A, 112B, 112C, and 112D can include a set of different color light sources such as different color LEDs and the signals sent from the controller 106 can select a specific one of the different color light sources to activate. However, additional systems to vary the light wavelength for each of the light sources 112A, 112B, 112C, and 112D are also contemplated.

In some embodiments, the inspection camera 102 includes different sensor channels configured to capture different portions of the image data corresponding to the different peak and ranges of light wavelengths emitted by each of the light sources 112A, 112B, 112C, and 112D. In some embodiments, the inspection camera 102 can include a Bayer filter or the like for separately detecting green, red, and blue light sources, but other sensor arrangements are contemplated. For example, the Bayer filter can be set up such that each individual pixel area of the sensor 107 can be associated with a distinct color filter (e.g. a red, green, or blue filter).

Furthermore, the inspection camera 102 can be configured to capture the image data as a sequence of discrete data frames such that groupings of a plurality of images compiled from the image data are combinable into a video sequence of the surface of interest. In general, information from each peak and range of light wavelengths emitted by the light sources 112A, 112B, 112C, and 112D that is captured in the channels of the inspection camera 102 is combinable into a composite image that includes the light emitted from each of the light sources 112A, 112B, 112C, and 112D. Each channel captures the directional lighting for that colored light source based on the location of the corresponding one of the light sources 112A, 112B, 112C, and 112D with respect to the inspection camera 102. Individual images are then processed, extracted, and reviewed (e.g. by the post processing system 108 or by an operator using a display device) to generate insights on the distress of the surface of interest of the device 109. Further image processing can also be performed to highlight the features of distress of the surface of interest of the device 109.

Excellent results have been shown using white light sources offset from a camera to throw shadows, to identify cracks in a surface of interest such as blades of a jet engine. However, because there is a directional dependency to identifying the cracks, when the crack or anomaly 122 lies in a plane with the light sources 112A and 112B and the inspection camera 102 as shown in FIG. 3, the white light techniques may be less effective. As such, the inspection system 100 described herein utilizes a color image made using the color capturing inspection camera 102 and light sources 112A, 112B, 112C, and/or 112D (see FIGS. 2-11) offset from each other around the inspection camera 102 to better identify the anomaly 122 lying in the plane with the light sources 112A and 112B and the inspection camera 102 as compared with the white light techniques. Further, channels 103 of the sensor 107 of the inspection camera 102 (e.g. a red, green, and/or blue channel) are separately processed to (i) create an evenly lit color composite image, and (ii) flattened or normalized to simplify comparison between each of the channels. Creating the evenly lit color composite image in this manner is also useful for single or multiple white light source applications. In some embodiments, the evenly lit color composite image can include an evenly lit natural color composite image.

Figure 14:
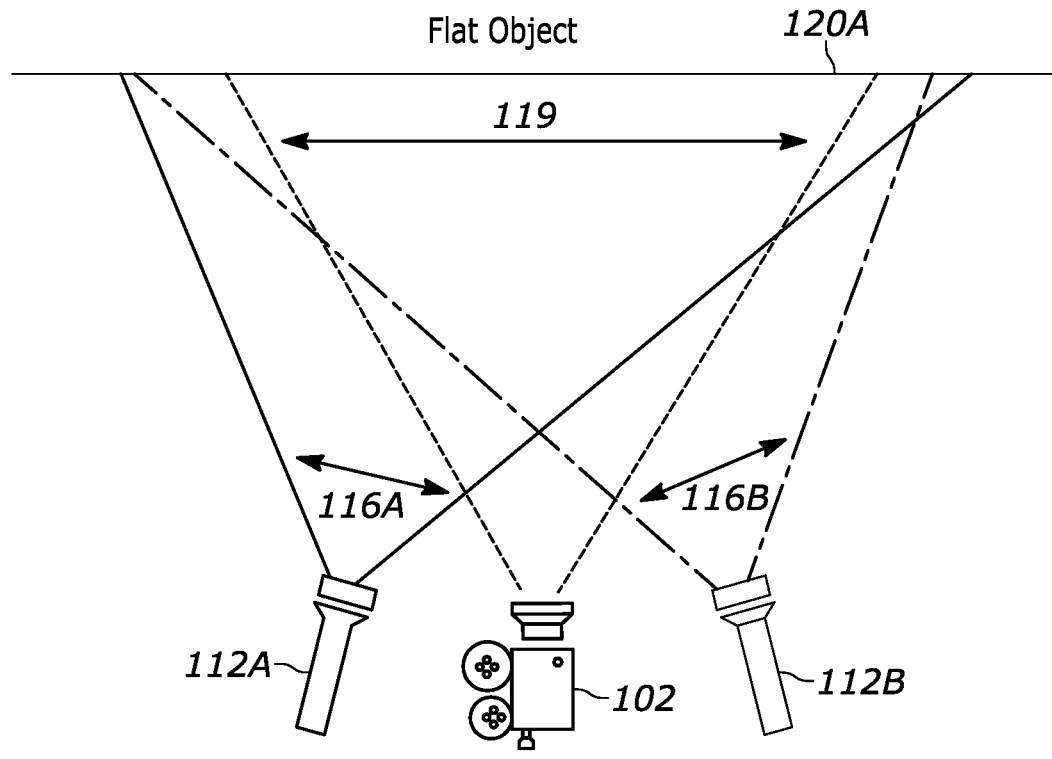
FIG. 14 comprises a schematic diagram of directional light of different wavelengths being emitted onto a surface of interest in accordance with various embodiments of these teachings.
Figure 15:
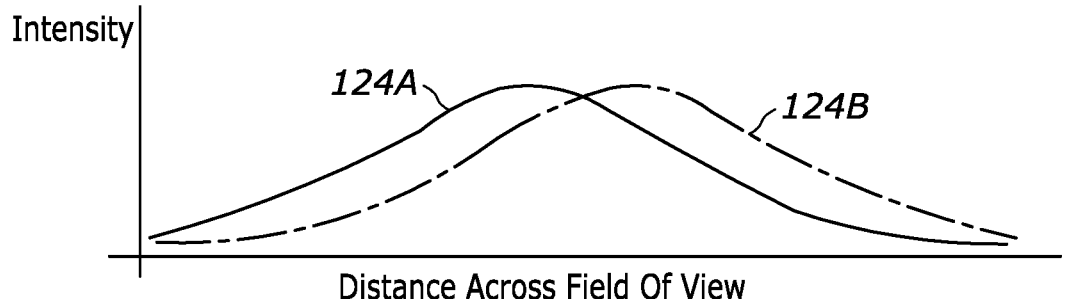
FIG. 15 comprises a chart of light intensity vs field of view for directional light of different wavelengths being emitted onto a surface of interest in accordance with various embodiments of these teachings.

Tunning now to FIG. 15, a chart of light intensity signals 124A and 124B from the light sources 112A and 112B, respectively, across the field of view 119 for a flat surface of interest 120A, as seen in FIG. 14, is shown. As can be seen in FIG. 15, the light intensity signals 124A and 124B for the light sources 112A and 112B are distributed as even bell shapes across the field of view 119 because of the flat nature of the surface of interest 120A. However, due to different directional patterns 116A and 116B, the light intensity signals 124A and 124B for the light sources 112A and 112B reaches a maximum value at different points or locations on the surface of interest 120A across the field of view 119.

Figure 16:
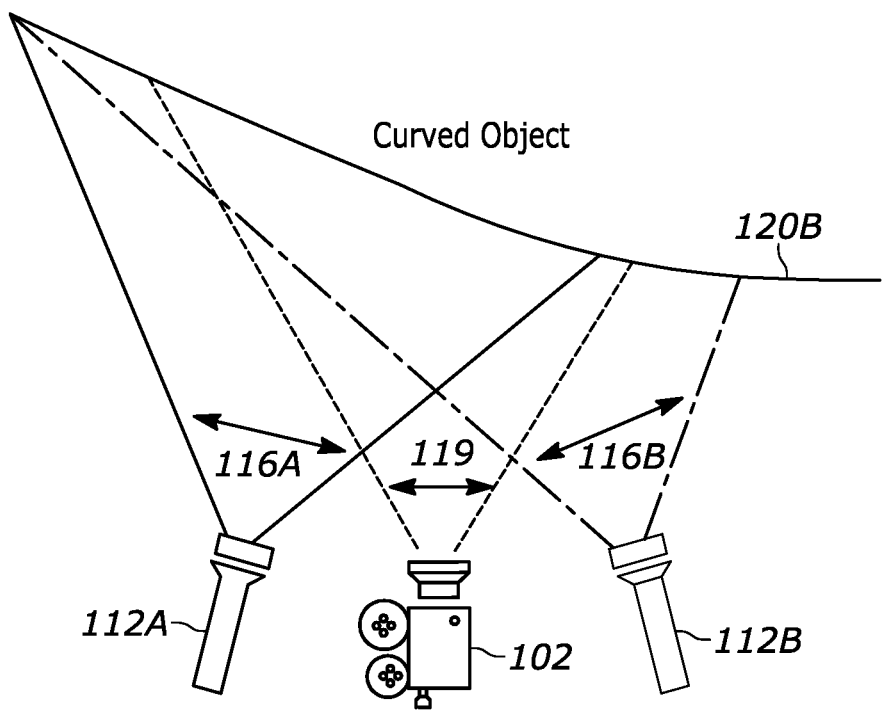
FIG. 16 comprises a schematic diagram of different wavelength directional light being emitted onto a surface of interest in accordance with various embodiments of these teachings.
Figure 17:
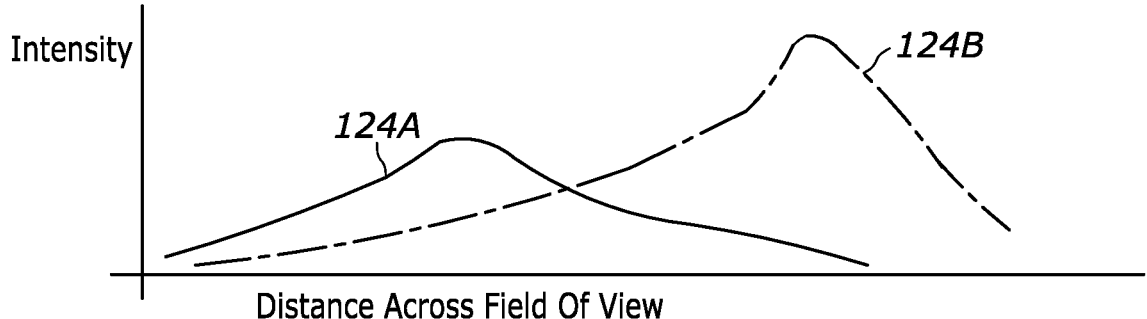
FIG. 17 comprises a chart of light intensity vs field of view for different wavelength directional light being emitted onto a surface of interest in accordance with various embodiments of these teachings.

Tunning now to FIG. 17, a chart of light intensity signals 124A and 124B from the light sources 112A and 112B, respectively, across the field of view 119 for a curved surface of interest 120B, as seen in FIG. 16, is shown. As can be seen in FIG. 17, the light intensity signal 124A for the light source 112A is an evenly distributed bell shape because the directional pattern 116A is emitted onto a generally flat section of the curved surface of interest 120B. In contrast, the light intensity signals 124B of the light source 112B is concentrated on one side and not evenly distributed across the field of view 119 because the directional pattern 116B is emitted onto a curved section of the curved surface of interest 120B. Further, as above, the different directional patterns 116A and 116B result in the light intensity signals 124A and 124B of the light sources 112A and 112B reaching a maximum value at different points or locations on the surface of interest 120B across the field of view 119.

Figure 18:
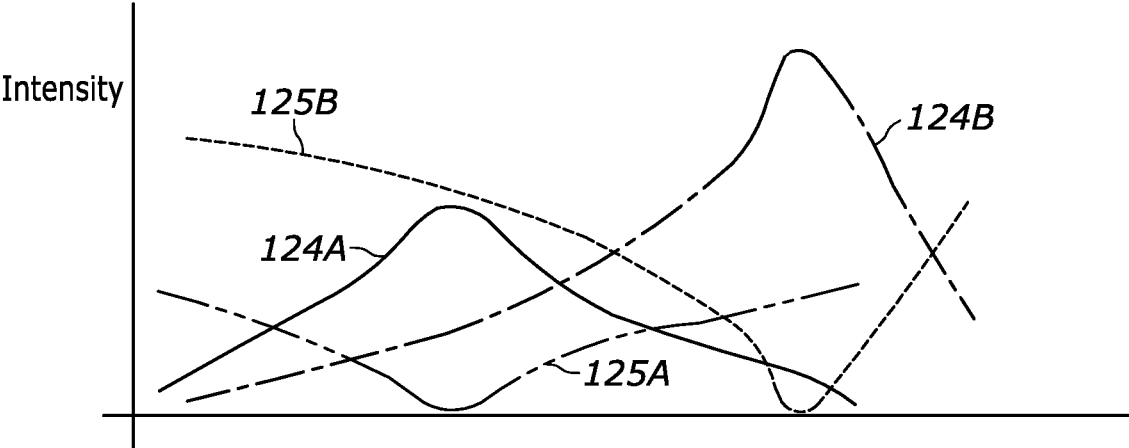
FIG. 18 comprises a chart of normalization functions in accordance with various embodiments of these teachings.

In some embodiments, the varying levels and location distribution of the light intensity signals 124A and 124B shown in FIGS. 15 and 17 can be normalized to a consistent flat signal response across the field of view 119 for processing by the post processing system 108. For example, in some embodiments, the light intensity signals 124A and 124B can be converted into the consistent flat signal response using normalizing functions 125A and 125B that are inverted versions of the light intensity signals 124A and 124B as seen in FIG. 18. In particular, the light intensity signal 124A can be multiplied by the normalizing function 125A to produce a flat response 134A and the light intensity signal 124B can be multiplied by the normalizing function 125B to produce a flat response 134B (See also FIG. 20).

Figure 19:
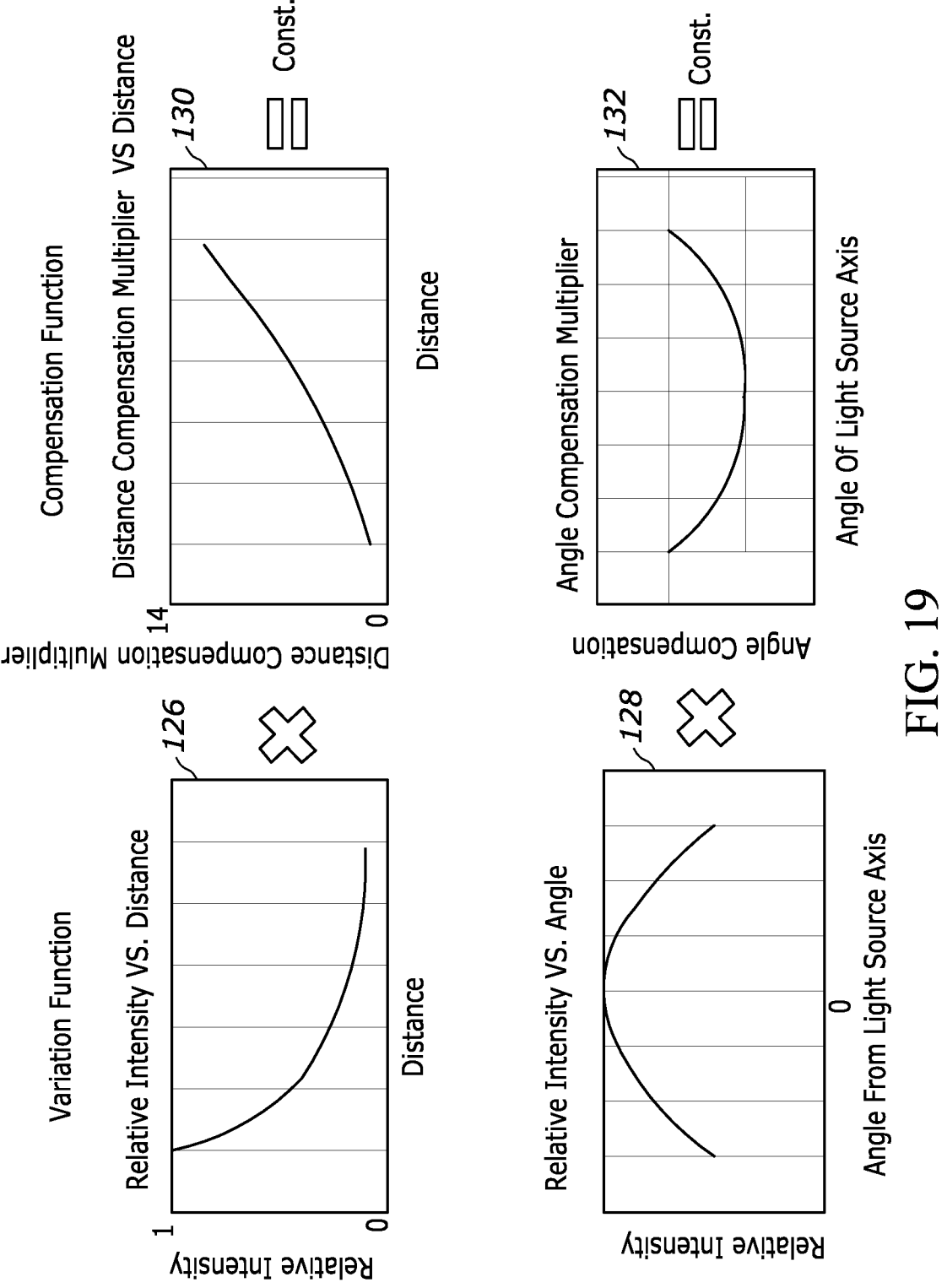
FIG. 19 comprises charts of compensation functions in accordance with various embodiments of these teachings.

In some embodiments, the light intensity signals 124A and 124B can have variability at different locations relative to the field of view 119 with respect to both a distance of the surface of interest 120 from the light sources 112A and 112B and an angle of those locations relative to the central axes X-1 and X-2. This variability is demonstrated by the distance variation function 126 and the angle variation function 128 shown in FIG. 19. To correct these variations, the normalizing functions 125A and 125B can be generated from a distance compensation function 130 and an angle compensation function 132 such as shown in FIG. 19. It will be appreciated that the distance compensation function 130 and an angle compensation function 132 can take various forms beyond those expressly shown in FIG. 19. Further in some embodiments, the post processing system 108 can select the distance compensation function 130 and the angle compensation function 132 from among a set of compensation functions stored in a memory device. In some embodiments, the post processing system 108 can select the distance compensation function 130 and the angle compensation function 132 based on the location of the light sources 112A and 112B and the inspection camera 102 relative to the surface of interest 120. The location of the light sources 112A and 112B and the inspection camera 102 relative to the surface of interest 120 can be determined by the post processing system via one or more sensors of the inspection system 100 and/or can be input to the post processing system 108 via a user interface thereof. Further still, in some embodiments, the system 108 can select the distance compensation function 130 and an angle compensation function 132 based on details of the surface of interest being examined by the inspection system 100. In some embodiments, the compensation functions can include combinations of compensation values based on distance and angle for every pixel in the field of view 119 for each channel of the sensor of the inspection camera 102.

Figure 20:
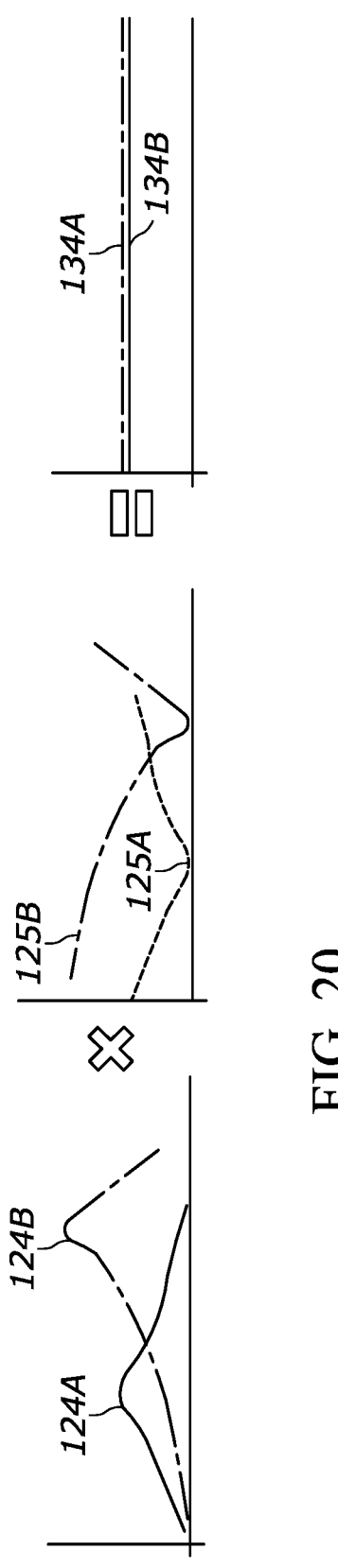
FIG. 20 comprises a flow diagram for applying compensation functions in accordance with various embodiments of these teachings.

Turning now to FIG. 20, a flow diagram for applying the normalizing functions 125A and 125B is shown. As seen in FIG. 20, after the normalizing functions 125A and 125B are generated or selected (such as from the distance compensation function 130 and an angle compensation function 132 or as a function of details of the surface of interest), the normalizing functions 125A and 125B can be multiplied with the light intensity signals 124A and 124B to yield the compensated constant light intensity signals 134A and 134B, respectively. In some embodiments, the normalizing functions 125A and 125B and also the distance compensation function 130 and an angle compensation function 132 can have different values for each pixel in the field of view 119.

In some embodiments, rather than storing the combined compensation functions 130 and 132, the normalizing functions 125A and 125B, and/or the sets of other compensation functions, a properties map for the device 109 and the surface of interest being examined such as described in U.S. patent application Ser. No. 17/373,917, the entirety of which is incorporated by reference, can be used to correct the light intensity signals 124A and 124B. For example, the properties map can be used to compensate for lighting and image variations at each pixel in each channel of the sensor of the inspection camera 102. In particular, the properties map of the device 109 and the surface of interest can define, for every pixel in the field of view 119, a distance between the inspection camera 102 and the surface of interest (e.g. a distance between the inspection camera 102 and bladed of a jet engine), an illumination intensity of each of the light sources 112A, 112B, 112C, and/or 112D individually, and other second order effects to account for variations in reflection at different angles. The second order effects can include a light ray angle with respect to the surface of interest (e.g. a blade surface) and the inspection camera 102, and a light ray angle with respect to the location of the light sources 112A, 112B, 112C, and/or 112D and the surface of interest. In some embodiments, the properties map can be used to generate normalizing functions 125A and 125B.

Further, in cases where the object being inspected is known in advance, the properties map may be constructed by a process of simulating the surface, the lighting and the imaging systems in a CAD model simulation to generate a sample image or images representative of how the object would look under normal illumination. For each pixel in the sample image or images, a factor is determined by which the light intensity of each pixel in the image can be scaled to produce the same value (e.g. to produce a flat image having a uniform intensity of light). These factors may be stored in an array, a representation of an array such as an image, or other suitable machine readable memory systems. Then, the saved factors, which were determined for each pixel in the sample image or image, can be applied, by for example the post processing system 108, to each pixel in the real image or images captured by the inspection camera 102. As such, the effects of color, reflectivity, surface texture, height, gradient, and angle of the light sources 112 to a normal of the surface of interest, and the effects of angle and distance to the inspection camera 102, may be neutralized, so that only anomalies, i.e. discrepancies between the surface represented in the CAD model and the actual surface, are emphasized in the resulting images or array of values output from the post processing system 108. The resulting computed image or array of values may be used to guide an observer or an artificial intelligence engine in subsequent inspection of the anomalies so as to improve detection of defects.

Turning now to FIG. 21, a flow diagram for a method 200 of operating the inspection system 100 is shown. The method 200 can include the outputting of directional light from the plurality of light sources of the lighting array 104 to illuminate the surface of interest from different directions, the directional light emitted by each of the plurality of light sources comprising a different respective range of light wavelengths, as in 202. Then, the method 200 can include capturing the image data with the inspection camera 102 while the surface of interest is being illuminated with the directional light, as in 204. Next, the method 200 can include processing portions of the image data into a plurality of images, the plurality of images including distinct images corresponding to the different respective range of light wavelengths emitted by each of the plurality of light sources, as in 206. Finally, the method 200 can include reviewing the plurality of images to identify an abnormal region of the surface of interest, as in 208. Reviewing the plurality of images can include processing the images with the post processing system 108 in the various manner described herein and/or presenting the plurality of images on a display device for review by an operator of the inspection system 100.

In some embodiments, the plurality of images includes a composite light image generated from portions of the image data that include each of the different respective ranges of light wavelengths emitted by each of the plurality of light sources. In these embodiments, processing the plurality of images to identify the abnormal region can include generating difference images by comparing the composite light image with other ones of the plurality of images, or comparing one of the plurality of images with another one of the plurality of images. For example, by subtracting ones of the plurality of images for a particular wavelength of light and direction from the mean calculated from the composite light image. The difference images can also be presented on the display device for review by the operator.

In embodiments where the different respective ranges of light wavelengths are captured in the different sensor channels of the inspection camera 102, processing the plurality of images with the post processing system 108 can include normalizing the different sensor channels to generate an evenly lit color composite image of the plurality of images. In some embodiments, surface gradients along the directions of the light sources 112A, 112B, 112C, and/or 112D can be extracted into the color composite image. After the composite image is generated, processing the plurality of images to identify the abnormal region can include generating difference images by comparing the evenly lit color composite image with other individual ones of the plurality of images.

As described above the properties map of the surface of interest, the compensation functions 130 and 132, the normalizing functions 125A and 125B, or other similar processes known in the art can be used to normalize the lighting data captured in the plurality of images generated from the image data from the inspection camera 102. The lighting data can include light reflection data, light intensity data, and/or other similar data documenting the directional light that was output onto the surface of interest. In particular, lighting data in each of the plurality of images can be normalized with respect to the different respective locations of the plurality of light sources 112A, 112B, 112C, and 112D. Further, in some embodiments, the evenly lit color composite image can be generated from the normalized lighting data. Further still, in some embodiments, the lighting data in each of the plurality of images can be normalized using a model of the surface of interest. In some embodiments, the model can include a computer modeled simulation of the surface of interest as exposed to simulations of the different respective ranges of light wavelengths. However, other embodiments for the model such as a physical model are also contemplated.

In some embodiments, the post processing system 108 can display one or more of the plurality of images on a display device to either document the abnormal region identified by the post processing system 108 or to enable an operator of the inspection system 100 to identify the abnormal region from the images without additional processing by the post processing system 108. In some embodiments, the abnormal region can be highlighted or otherwise called out within the display window so as to clearly present the region to a user of the inspection system 100. In some embodiments, the post processing system 108 can overlay one or more of the difference images with the evenly lit color composite image to emphasize the abnormal region in the display window. In some embodiments, highlighting, call-outs and/or overlaying can be done on a live video feed of the surface of interest. The live video feed can be constructed from one or more of the plurality of images extracted and generated from the image data captured by the inspection camera 102.

In some embodiments, the inspection system 100 and the method 200 can be used in conjunction with other inspection tools and processes to identify a location in the device 109 to be inspected. For example, visual inspection or artificial intelligence system processing of a feed from the inspection camera 102 can be used to identify a section of the device 109 that is showing signs of distress sufficient to warrant further inspection. Then, that identified section can be subject to the different wavelengths of light and post processing as described herein to produce enhanced insights on the level of distress of the identified section. Further, in some embodiments, the same or a different artificial intelligence process of the post processing system 108 can highlight or call out the abnormal region to the user in the images processed by the post processing system 108.

Further aspects of the disclosure are provided by the subject matter of the following clauses:

A method, comprising: simultaneously outputting directional light from a plurality of light sources to illuminate a surface of interest from different directions, wherein each of the plurality of light sources emit a different range of light wavelengths, wherein each of the plurality of light sources are positioned at different respective locations relative to an inspection camera so as to illuminate the surface of interest from the different directions; capturing image data with the inspection camera while the surface of interest is illuminated with the directional light; processing the image data into a plurality of images, the plurality of images including at least one distinct image that corresponds to one of the different ranges of light wavelengths emitted by a respective one of the plurality of light sources.

The method of any preceding clause further comprising reviewing the plurality of images to identify an abnormal region of the surface of interest The method of any preceding clause, further comprising reviewing the plurality of images to identify an abnormal region of the surface of interest, wherein the plurality of images includes a composite light image generated from portions of the image data that include each different respective range of light wavelengths emitted by each of the plurality of light sources, and wherein reviewing the plurality of images to identify the abnormal region includes generating difference images by comparing the composite light image with other ones of the plurality of images.

The method of any preceding clause, further comprising capturing the image data as a sequence of discrete data frames such that groupings of the plurality of images are combinable into a video sequence of the surface of interest.

The method of any preceding clause, further comprising capturing portions of the image data in different sensor channels of the inspection camera, the different sensor channels corresponding to the different respective range of light wavelengths emitted by each of the plurality of light sources.

The method of any preceding clause, further comprising normalizing those of the plurality of images that are generated from the portions of the image data from each of the different sensor channels to generate an evenly lit color composite image of the plurality of images, wherein reviewing the plurality of images to identify the abnormal region includes generating difference images by comparing at least one of the plurality of images with at least one of other ones of the plurality of images and the evenly lit color composite image.

The method of any preceding clause, further comprising: normalizing lighting data in each of the plurality of images with respect to the different respective locations of the plurality of light sources; and generating the evenly lit color composite image from the lighting data as normalized.

The method of any preceding clause further comprising normalizing the lighting data in each of the plurality of images using a model of the surface of interest.

The method of any preceding clause further comprising comparing one or more of the plurality of images or the evenly lit composite color image with at least one other of the plurality of images to accentuate shadows present in the one or more of the plurality of images, the shadows being cast by features of the surface of interest in response to the directional light.

The method of any preceding clause, further comprising overlaying one or more of the difference images with the evenly lit color composite image.

An inspection system comprising: a guide tube; and a plurality of light sources coupled to the guide tube at different respective locations so as to impart different directionality to directional light output from each of the plurality of light sources onto a surface of interest, the directional light from each of the plurality of light sources having a different respective range of light wavelengths.

The inspection system of any preceding clause further comprising an inspection camera configured to activate so as to capture image data while the surface of interest is being illuminated with the directional light.

The inspection system of any preceding clause, wherein the inspection camera comprises a borescope configured to pass through an interior of the guide tube.

The inspection system of any preceding clause, further comprising a controller electrically coupled to the inspection camera and the plurality of light sources, wherein the controller is configured to direct the plurality of light sources to output the directional light and to activate the inspection camera to capture the image data.

The inspection system of any preceding clause, further comprising a post processing system configured to receive the image data, process the image data into a plurality of images that include at least one distinct image that corresponds to one of the different ranges of light wavelengths emitted by a respective one of the plurality of light sources, and process the plurality of images to identify an abnormal region of the surface of interest.

The inspection system of any preceding clause, wherein the inspection camera includes different sensor channels configured to capture different portions of the image data corresponding to the different respective range of light wavelengths output by reach of the plurality of light sources.

The inspection system of any preceding clause, further comprising a post processing system configured to receive the image data, process portions of the image data into a plurality of images that include distinct images corresponding to the different respective range of light wavelengths output by reach of the plurality of light sources, normalize the different sensor channels to generate an evenly lit color composite image, generate difference images by comparing the evenly lit color composite image with individual ones of the plurality of images, and identify an abnormal region of the surface of interest using at least one of the evenly lit color composite image and the difference images.

The inspection system of any preceding clause, wherein the post processing system is further configured to: normalize lighting data in each of the plurality of images with respect to the different respective locations of the plurality of light sources; and generate the evenly lit color composite image from the lighting data as normalized.

The inspection system of any preceding clause wherein the post processing system is further configured to normalize lighting data in each of the plurality of images using a model of the surface of interest.

The inspection system of any preceding clause, wherein the different respective locations at which each of the plurality of light sources are positioned includes a concentric arrangement around an exterior of the guide tube.

The inspection system of any preceding clause, wherein the plurality of light sources are selectively deployable from a resting position concentric around an exterior of the guide tube into an extended position.

The inspection system of any preceding clause, wherein each of the plurality of light sources are located in line with each other.

An inspection system comprising an inspection camera; and a plurality of light sources collocated with the inspection camera, wherein each of the plurality of light sources is configured to output directional light onto a surface of interest, the directional light from each of the plurality of light sources having a different respective range of light wavelengths, and wherein each of the plurality of light sources are positioned at different respective locations relative to the inspection camera so as to impart different directionality to the directional light output from each of the plurality of light sources, wherein the inspection camera is configured to capture image data while the surface of interest is being illuminated with the directional light.

The inspection system of any preceding clause further comprising a controller electrically coupled to the inspection camera and the plurality of light sources, wherein the controller is configured to direct the plurality of light sources to output the directional light and to direct the inspection camera to capture the image data.

The inspection system of any preceding clause further comprising a post processing system configured to receive the image data, process portions of the image data into a plurality of images that include distinct images corresponding to the different wavelengths of light, and process the plurality of images to identify an abnormal region of the surface of interest.

The inspection system of any preceding clause wherein the different respective locations at which each of the plurality of light sources are positioned includes a concentric arrangement around the inspection camera.

The inspection system of any preceding clause wherein the plurality of light sources are selectively deployable from a resting position concentric around the inspection camera into an extended position.

The inspection system of any preceding clause wherein each of the plurality of light sources are located in line with each other.

The inspection system of any preceding clause further comprising a guide tube to which each of plurality of light sources are coupled, and wherein the inspection camera comprises a borescope configured to pass through an interior of the guide tube.

The inspection system of any preceding clause wherein the inspection camera includes different sensor channels configured to capture different portions of the image data corresponding to the different respective range of light wavelengths output by reach of the plurality of light sources.

The inspection system of any preceding clause further comprising a post processing system configured to receive the image data, process portions of the image data into a plurality of images that include distinct images corresponding to the different wavelengths of light, normalize the different sensor channels to generate an evenly lit color composite image, generate difference images by comparing the evenly lit color composite image with individual ones of the plurality of images, and identify an abnormal region of the surface of interest using at least one of the evenly lit color composite image and the difference images.

The inspection system of any preceding clause, wherein the post processing system is further configured to normalize lighting data in each of the plurality of images with respect to the different respective locations of the plurality of light sources; and generate the evenly lit color composite image from the lighting data as normalized.

The inspection system of any preceding clause wherein the post processing system is further configured to normalize lighting data in each of the plurality of images using a model of the surface of interest.

What is claimed is:

1. An inspection system comprising:

a guide tube;

a plurality of light sources coupled to the guide tube at different respective locations so as to impart different directionality to directional light output from each of the plurality of light sources onto a surface of interest, the directional light from each of the plurality of light sources having a different respective range of light wavelengths;

an inspection camera configured to activate so as to capture image data while the surface of interest is being simultaneously illuminated with the directional light from the plurality of light sources, wherein the inspection camera includes different sensor channels configured to capture different portions of the image data corresponding to the different respective range of light wavelengths output by each of the plurality of light sources; and a post processing system configured to receive the image data, process portions of the image data into a plurality of distinct images corresponding to each of the different respective range of light wavelengths output by each of the plurality of light sources, normalize the different sensor channels to generate an evenly lit color composite image, generate difference images by comparing the evenly lit color composite image with individual ones of the plurality of distinct images, and identify an abnormal region of the surface of interest using at least one of the evenly lit color composite image and the difference images.

2. The inspection system of claim 1, comprising a controller electrically coupled to the inspection camera and the plurality of light sources, wherein the controller is configured to direct the plurality of light sources to simultaneously output the directional light and to activate the inspection camera to capture the image data.

3. The inspection system of claim 2, wherein the plurality of light sources are tunable to alter a peak or range of light wavelengths of the directional light from each of the plurality of light sources and the controller sends signals to the plurality of light sources to alter a peak or range of light wavelengths of the directional light from each of the plurality of light sources.

4. The inspection system of claim 1, wherein the post processing system is further configured to:

normalize lighting data in each of the plurality of distinct images with respect to the different respective locations of the plurality of light sources; and generate the evenly lit color composite image from the lighting data as normalized.

5. The inspection system of claim 1 wherein the post processing system is further configured to normalize lighting data in each of the plurality of distinct images using a model of the surface of interest.

6. The inspection system of claim 1, wherein the different respective locations at which each of the plurality of light sources are positioned includes a concentric arrangement around an exterior of the guide tube.

7. The inspection system of claim 1, wherein the plurality of light sources are selectively deployable from a resting position concentric around an exterior of the guide tube into an extended position.

8. The inspection system of claim 1, wherein each of the plurality of light sources are located in line with each other.

9. The inspection system of claim 1, wherein the plurality of light sources include a first light source emitting directional light having a range of light wavelengths associated with the color green, a second light source emitting directional light having a range of light wavelengths associated with the color red, and a third light source emitting directional light having a range of light wavelengths associated with the color blue.

10. The inspection system of claim 1, wherein the inspection camera is configured to activate to capture the image data as a sequence of discrete data frames such that groupings of a plurality of images are combinable into a video sequence of the surface of interest.

11. An inspection system comprising:

a guide tube;

a borescope comprising an inspection camera, the borescope configured to pass through an interior of the guide tube to a distal end thereof;

a plurality of light sources coupled to the distal end of the guide tube and positioned at different respective locations relative to the inspection camera so as to impart different directionality to directional light output from each of the plurality of light sources onto a surface of interest, the directional light from each of the plurality of light sources having a different respective range of light wavelengths;

a controller electrically coupled to the inspection camera and the plurality of light sources, wherein the controller is configured to direct the plurality of light sources to simultaneously output the directional light and to activate the inspection camera to capture image data while the surface of interest is illuminated with the directional light; and a post processing system configured to receive the image data from the inspection camera, process portions of the image data into a plurality of distinct images corresponding to the different respective range of light wavelengths output by each of the plurality of light sources, normalize lighting data in each of the plurality of distinct images with respect to the different respective locations of the plurality of light sources; and generate an evenly lit color composite image from the lighting data as normalized, wherein the post processing system is further configured to generate difference images by comparing the evenly lit color composite image with individual ones of the plurality of distinct images and identify an abnormal region of the surface of interest using at least one of the evenly lit color composite image and the difference images; wherein the post processing system includes a display device for displaying the difference images.

12. The inspection system of claim 11, wherein the inspection camera includes different sensor channels configured to capture different portions of the image data corresponding to the different respective ranges of light wavelengths.

13. An inspection system comprising:

an inspection camera; and a plurality of light sources positioned at different respective locations relative to the inspection camera and emitting directional light onto a surface of interest, wherein at least two of the plurality of light sources have different respective range of light wavelengths;

wherein the inspection camera is configured to activate so as to capture image data while the surface of interest is being simultaneously illuminated with the directional light from the plurality of light sources, wherein the inspection camera includes different sensor channels configured to capture different portions of the image data corresponding to the different respective ranges of light wavelengths; and further comprising a post processing system configured to receive the image data, process portions of the image data into a plurality of distinct images corresponding to each of the different respective ranges of light wavelengths, normalize the different sensor channels to generate an evenly lit color composite image, generate difference images by comparing the evenly lit color composite image with individual ones of the plurality of images, and identify an abnormal region of the surface of interest using at least one of the evenly lit color composite image and the difference images.

14. The inspection system of claim 13, wherein the inspection camera is positioned at a distal end of a guide tube, the guide tube being elongated and narrow for insertion into a confined space and performing an inspection therein.

* * * * *